(12) United States Patent
Bianco Mengotti

(10) Patent No.: US 12,391,377 B2
(45) Date of Patent: Aug. 19, 2025

(54) VERTICAL TAKE-OFF AND LANDING AIRCRAFT AND RELATED CONTROL METHOD

(71) Applicant: LEONARDO S.P.A., Rome (IT)

(72) Inventor: Riccardo Bianco Mengotti, Samarate (IT)

(73) Assignee: LEONARDO S.P.A., Rome (IT)

( * ) Notice: Subject to any disclaimer, the term of this patent is extended or adjusted under 35 U.S.C. 154(b) by 875 days.

(21) Appl. No.: 17/605,764

(22) PCT Filed: Mar. 30, 2020

(86) PCT No.: PCT/IB2020/053020
§ 371 (c)(1),
(2) Date: Oct. 22, 2021

(87) PCT Pub. No.: WO2020/217117
PCT Pub. Date: Oct. 29, 2020

(65) Prior Publication Data
US 2022/0258859 A1   Aug. 18, 2022

(30) Foreign Application Priority Data

Apr. 23, 2019   (EP) .................................... 19170690

(51) Int. Cl.
*B64C 29/00* (2006.01)
*B64C 11/00* (2006.01)
(Continued)

(52) U.S. Cl.
CPC ........ *B64C 29/0025* (2013.01); *B64C 11/001* (2013.01); *B64C 39/12* (2013.01);
(Continued)

(58) Field of Classification Search
CPC ....... B64C 11/00; B64C 11/001; B64C 27/20; B64C 27/22; B64C 27/26; B64C 29/00;
(Continued)

(56) References Cited

U.S. PATENT DOCUMENTS 2,339,338 A * 1/1944 Karlik .................... B64C 17/00
                                                                244/46
2,828,929 A   4/1958 Lippisch
(Continued)

FOREIGN PATENT DOCUMENTS

CN       105292444 A     2/2016
CN       105 539 835     5/2016
(Continued)

OTHER PUBLICATIONS

First Chinese Office Action in CN Application No. 202080045689.3, mailed Jan. 10, 2024, an English Translation attached herewith (32 pages).

*Primary Examiner* — Richard Green
(74) *Attorney, Agent, or Firm* — Leason Ellis LLP

(57) ABSTRACT

An aircraft capable of vertical take-off and landing, comprising a first propulsion unit configured to generate a first thrust directed along a first axis; a second propulsion unit configured to generate a second thrust directed along a second axis; the first propulsion unit and the second propulsion unit can be operated independently of one another; the first axis and second axis are inclined to one another with respect to a first longitudinal direction of the aircraft; the first axis and the second axis are fixed with respect to the aircraft.

24 Claims, 13 Drawing Sheets

(51) Int. Cl.
    *B64C 39/12*    (2006.01)
    *B64U 10/20*    (2023.01)
    *B64U 30/10*    (2023.01)
    *B64U 50/14*    (2023.01)
    *B64U 50/18*    (2023.01)

(52) U.S. Cl.
    CPC ............. *B64U 10/20* (2023.01); *B64U 30/10* (2023.01); *B64U 50/14* (2023.01); *B64U 50/18* (2023.01)

(58) Field of Classification Search
    CPC ............ B64C 29/0008; B64C 29/0016; B64C 29/0025; B64C 25/00; B64C 25/001; B64C 25/04; B64C 25/06; B64C 39/12; B64U 10/16; B64U 60/00; B64U 60/60
    See application file for complete search history.

(56) References Cited

U.S. PATENT DOCUMENTS

| | | | | |
|---|---|---|---|---|
| 2,940,689 | A * | 6/1960 | Howell | B64C 29/0025 244/12.3 |
| 3,056,565 | A * | 10/1962 | Griffith | B64C 29/0025 244/12.3 |
| 3,082,977 | A * | 3/1963 | Arlin | B64C 29/0025 244/92 |
| 3,110,456 | A * | 11/1963 | Creasey | B64C 29/0016 244/12.3 |
| 3,120,362 | A * | 2/1964 | Lloyd | B64C 29/0016 244/12.3 |
| 3,139,244 | A * | 6/1964 | Bright | B64C 29/0025 244/12.3 |
| 3,161,374 | A * | 12/1964 | Allred | B64C 29/0025 244/12.3 |
| 3,310,260 | A * | 3/1967 | Chichester-Miles | B64C 29/0025 244/12.5 |
| 3,388,878 | A * | 6/1968 | Peterson | B64C 29/0033 244/12.3 |
| 3,499,620 | A * | 3/1970 | Strum | B64C 29/0033 244/12.4 |
| 3,618,875 | A * | 11/1971 | Kappus | B64C 29/0025 244/12.3 |
| 3,856,238 | A * | 12/1974 | Malvestuto, Jr. | B64B 1/00 244/6 |
| 5,890,441 | A * | 4/1999 | Swinson | B64U 10/13 244/12.3 |
| 6,568,630 | B2 * | 5/2003 | Yoeli | B64U 30/26 244/12.3 |
| 6,843,447 | B2 * | 1/2005 | Morgan | B64C 5/02 244/12.3 |
| 7,159,817 | B2 * | 1/2007 | VanderMey | B64C 39/08 244/17.23 |
| 7,857,254 | B2 * | 12/2010 | Parks | B64C 29/0041 244/12.4 |
| 8,393,564 | B2 * | 3/2013 | Kroo | B64C 29/0025 244/6 |
| 8,485,464 | B2 * | 7/2013 | Kroo | B64C 29/00 244/6 |
| 8,636,241 | B2 * | 1/2014 | Lugg | B64D 27/24 244/12.3 |
| 9,120,560 | B1 * | 9/2015 | Armer | B64U 30/20 |
| 9,132,915 | B2 * | 9/2015 | Zhu | B64C 29/0033 |
| 9,242,738 | B2 * | 1/2016 | Kroo | B64C 39/12 |
| 9,764,833 | B1 | 9/2017 | Tighe et al. | |
| 9,845,150 | B2 * | 12/2017 | Kroo | B64C 27/08 |
| 9,889,928 | B2 * | 2/2018 | Salz | B64C 27/30 |
| 9,944,386 | B1 * | 4/2018 | Reichert | B64C 25/54 |
| 10,040,547 | B1 * | 8/2018 | Pedigo | B64U 30/10 |
| 10,053,213 | B1 * | 8/2018 | Tu | B64C 27/82 |
| 10,081,436 | B1 * | 9/2018 | Tian | B64U 10/20 |
| 10,086,931 | B2 * | 10/2018 | Reichert | B64D 27/24 |
| 10,322,814 | B1 * | 6/2019 | Tian | B64C 29/0025 |
| 10,427,784 | B2 * | 10/2019 | Parks | B64C 29/0091 |
| 10,472,064 | B2 * | 11/2019 | Tian | B64U 50/19 |
| 10,518,875 | B2 * | 12/2019 | Judas | B64U 10/20 |
| 10,526,079 | B1 * | 1/2020 | Reichert | B64C 29/0025 |
| 10,577,091 | B2 * | 3/2020 | Parks | B64C 39/12 |
| 10,689,102 | B2 * | 6/2020 | Tovkach | B64C 27/50 |
| 10,703,467 | B2 * | 7/2020 | Tovkach | B64D 35/02 |
| 10,710,713 | B2 * | 7/2020 | Mia | B64C 29/0025 |
| 10,710,735 | B2 * | 7/2020 | Murrow | B64C 3/38 |
| 10,723,433 | B2 * | 7/2020 | Woodworth | B64U 20/70 |
| 10,737,766 | B2 * | 8/2020 | Mores | B64C 11/001 |
| 10,766,614 | B2 * | 9/2020 | Parks | B64C 29/0016 |
| 10,822,101 | B2 * | 11/2020 | Murrow | B64D 35/02 |
| 10,836,475 | B2 * | 11/2020 | Pfaller | B64C 29/0025 |
| 10,974,815 | B2 * | 4/2021 | Reichensperger | B64C 27/20 |
| 10,981,650 | B2 * | 4/2021 | Fink | B64C 27/22 |
| 11,034,445 | B2 * | 6/2021 | Woodworth | B64U 10/25 |
| 11,052,998 | B2 * | 7/2021 | Mores | B64U 10/13 |
| 11,066,161 | B2 * | 7/2021 | Mermoz | B64D 27/33 |
| 11,148,797 | B1 * | 10/2021 | Robertson | B64C 19/00 |
| 11,220,325 | B2 * | 1/2022 | Kiesewetter | B64C 11/001 |
| 11,554,862 | B2 * | 1/2023 | Kiesewetter | B64C 27/08 |
| 11,584,524 | B2 * | 2/2023 | Regev | B64C 3/40 |
| 11,623,745 | B2 * | 4/2023 | Tian | B64C 35/005 244/6 |
| 11,628,933 | B2 * | 4/2023 | Weekes | B64U 30/20 244/6 |
| 11,691,722 | B2 * | 7/2023 | Fink | B64C 29/0025 244/7 A |
| 2003/0038213 | A1 * | 2/2003 | Yoeli | B64C 11/001 244/50 |
| 2003/0062443 | A1 * | 4/2003 | Wagner | B64C 27/20 244/12.3 |
| 2004/0144890 | A1 * | 7/2004 | Mao | B64C 29/0025 244/12.5 |
| 2004/0245374 | A1 * | 12/2004 | Morgan | B64C 29/0025 244/12.3 |
| 2005/0230524 | A1 | 10/2005 | Ishiba | |
| 2006/0151666 | A1 * | 7/2006 | VanderMey | B64C 29/0016 244/12.3 |
| 2006/0226281 | A1 | 10/2006 | Walton | |
| 2007/0018035 | A1 * | 1/2007 | Saiz | B64C 39/10 244/12.3 |
| 2007/0057113 | A1 * | 3/2007 | Parks | B64C 29/0041 244/12.5 |
| 2007/0246601 | A1 * | 10/2007 | Layton | B64C 29/0025 244/12.2 |
| 2012/0012692 | A1 * | 1/2012 | Kroo | B64C 29/0025 244/6 |
| 2012/0280091 | A1 * | 11/2012 | Saiz | B64C 27/30 244/6 |
| 2013/0020429 | A1 * | 1/2013 | Kroo | B64C 29/0025 244/6 |
| 2013/0062455 | A1 * | 3/2013 | Lugg | B64C 39/12 244/12.3 |
| 2013/0112804 | A1 * | 5/2013 | Zhu | B64C 29/0033 244/2 |
| 2013/0140404 | A1 * | 6/2013 | Parks | B64C 11/30 244/23 A |
| 2014/0158815 | A1 | 6/2014 | Renteria | |
| 2016/0207625 | A1 * | 7/2016 | Judas | B64U 10/20 |
| 2016/0236775 | A1 * | 8/2016 | Eshkenazy | B64C 29/0025 |
| 2016/0311529 | A1 * | 10/2016 | Brotherton-Ratcliffe | B64D 35/06 |
| 2017/0158321 | A1 * | 6/2017 | Mia | B64C 29/005 |
| 2018/0065741 | A1 * | 3/2018 | Vondrell | B64U 50/14 |
| 2018/0086448 | A1 * | 3/2018 | Kroo | B64C 29/0033 |
| 2018/0141652 | A1 * | 5/2018 | Deslypper | B64C 39/12 |
| 2018/0208296 | A1 * | 7/2018 | Mores | B64C 11/001 |
| 2018/0215465 | A1 * | 8/2018 | Renteria | B64C 27/28 |
| 2019/0106206 | A1 * | 4/2019 | Shi | B64U 30/295 |
| 2019/0127056 | A1 * | 5/2019 | Weekes | B64C 39/12 |
| 2019/0233098 | A1 * | 8/2019 | Tian | B64C 11/46 |
| 2019/0233107 | A1 * | 8/2019 | Tian | B64C 39/12 |
| 2019/0270517 | A1 * | 9/2019 | Morgan | B64C 11/001 |
| 2020/0239134 | A1 * | 7/2020 | Robertson | B64C 29/0033 |

(56) References Cited

U.S. PATENT DOCUMENTS

2020/0283134 A1\*  9/2020  Mores .................... B64U 10/13
2020/0346746 A1\*  11/2020  Duffy ..................... B64U 10/16
2022/0009626 A1\*  1/2022  Baharav ................. B64C 27/26

FOREIGN PATENT DOCUMENTS

| CN | 105539835 A | 5/2016 |
| CN | 105620735 A | 6/2016 |
| CN | 107074358 A | 8/2017 |
| CN | 109 263 906 | 1/2019 |
| EP | 3 354 560 | 8/2018 |
| EP | 3702277 B1 | 1/2021 |
| GB | 935 884 | 9/1963 |
| RO | 133972 A2 \* | 3/2020 |
| WO | WO 2018/038822 | 3/2018 |
| WO | WO 2018/075412 | 4/2018 |
| WO | WO 2019/126612 | 6/2019 |

\* cited by examiner

VERTICAL TAKE-OFF AND LANDING AIRCRAFT AND RELATED CONTROL METHOD

CROSS-REFERENCE TO RELATED APPLICATIONS

This patent application is a U.S. National Phase Application under 35 U.S.C. § 371 of International Patent Application No. PCT/IB2020/053020, filed on Mar. 30, 2020, which claims priority from European patent application no. 19170690.2, filed on Apr. 23, 2019, all of which are incorporated by reference, as if expressly set forth in their respective entireties herein.

TECHNICAL FIELD

The present invention relates to an aircraft capable of vertical take-off and landing.

STATE OF THE PRIOR ART

There is awareness in the aeronautical industry since the second half of the twentieth century of the need for aeroplanes capable of vertical take-off and landing and having sufficiently high cruising speeds to be able to cover medium to long range routes in less time.

A partial solution to this need is constituted by helicopters and convertiplanes, which, however, are not without drawbacks.

Helicopters effectively have a maximum speed of approximately 350 km/h.

Convertiplanes basically comprise:
a fuselage extending along a first axis; and
a pair of wings extending along a second axis and supporting respective engines tilting about the second axis.

More specifically, the convertiplane assumes a helicopter configuration when the engines are arranged so as to have respective third rotation axes orthogonal to the aforementioned first and second axes.

In addition, convertiplane assumes an aeroplane configuration when the engines are arranged so as to have the respective third axes parallel to the first axis.

Due to the fact that it is necessary to tilt the engines about the second axis to carry out the transition between the helicopter configuration and the aeroplane configuration, convertiplanes are particularly complex from the constructional viewpoint.

A further solution proposed to meet this need is constituted by Vertical Take-Off and Landing (VTOL) aircraft.

The latter have engines with orientable exhaust nozzles so as to direct the resultant thrust in a vertical direction during take-off/landing or in a horizontal direction during horizontal flight.

Notwithstanding their diffusion and efficiency, the constructional configuration of VTOL aircraft is particularly complex. This derives from the fact that it is necessary to selectively orientate the direction of thrust of the engines according to the take-off/landing/flight conditions of the aircraft.

There is therefore awareness in the industry of the need for vertical take-off and landing aircrafts that ensure flight performance comparable to convertiplanes and aircrafts with orientable thrust and that, at the same time, are the least complex from the constructional and operational viewpoint and have weights and costs as low as possible.

EP-A-3354560 describes a multicopter basically comprising:
a fuselage;
a pair of first propulsion units arranged on a first side of the fuselage; and
a pair of second propulsion units arranged on a second side of the fuselage, opposite to the first side.

Each first (second) propulsion unit basically comprises two rotors rotatable about respective rotation axes inclined to one another.

In consequence, the rotors of each first (second) propulsion unit respectively generate a first and a second thrust orientated respectively in a first and a second direction inclined to one another.

The aforementioned first and second thrusts have a thrust vector orientated in the plane defined by the first and second directions.

By controlling the rotational speed of the rotors of each first (second) propulsion unit and/or adjusting the pitch of the associated blades, it is possible to orientate the direction and adjust the modulus of the overall thrust vector generated by the first (second) propulsion unit.

The first (second) propulsion units also have different angles of inclination from one another with respect to a longitudinal direction of the aircraft.

US-A-2014/0158815 discloses a zero-transition vertical take-off and landing aircraft according to the preamble of claim 1 as well as a method of control according to the preamble of claim 26.

WO-A-2018/038822 discloses a multicopter aircraft with a wide span rotor configuration. In various embodiments, a multicopter includes a fuselage and a plurality of rotors. The plurality of rotors includes inner rotors and outer rotors, with the inner rotors being substantially surrounded by the outer rotors or the fuselage. The inner rotors and the outer rotors may be tilted based at least in part on their arrangement in relation to the fuselage.

U.S. Pat. No. 9,764,833 discloses a rotor mounting boom assembly with a rotor mounting boom releasably attachable to a wing of the personal aircraft, one or more vertical lift rotors, and one or more rotor controller assemblies. Controller assemblies for each rotor are positioned on the rotor mounting booms such that downwash from the rotor causes increased airflow across the controller assembly to cool the controller assembly components. A rotor controller enclosure includes an air inlet and an air outlet to allow airflow through the enclosure to cool the controller components. The air inlet is positioned relative to the path of the rotor blades such that the downwash from the rotor that flows into the air inlet is maximized. The structure of the enclosure includes features for increasing the airflow through the enclosure.

US-A-2005/0230524 discloses a vertical take-off and landing aircraft is provided with a plurality of thrust generators which generate thrust substantially vertically upward with respect to the aircraft; a first prime mover which drives the thrust generators, and an occupant seat. At least one of the thrust generators is disposed at either a front section of the aircraft or a rear section of the aircraft, and the remaining thrust generator or thrust generators are disposed at either the rear section or the front section, whichever the at least one of the thrust generators is not disposed at. The prime mover and a sitting surface of the occupant seat are disposed between the at least one of the thrust generators at the front section of the aircraft and the at least one of the thrust generators at the rear section of the aircraft, and in a position lower than all of the thrust generators. The center of gravity of the vertical take-off and landing aircraft is below the center of the aircraft and hangs down when the aircraft is in flight due to the thrust generated by the thrust generators.

U.S. Pat. No. 2,828,929 discloses a wingless aircraft comprising, a body member formed with in upwardly extending rear portion, first and second ducts formed through the body portion. The ducts are formed at an angle of approximately thirty degrees relative to each other in the shape of an inverted Y. The inverted V extends along the body member, the more rearward duct forming with said upwardly extending rear portion an airfoil. The airfoil provides lift in flying position, first propulsion means are mounted in the first duct, second propulsion means are mounted in the second duct, and an aerodynamic control means are mounted on said body member to control the aircraft in pitch, yaw and roll.

CN-A-109263906 discloses a composite wing comprising a wing body, a motor and a propeller. The wing body is identical to a conventional wing, having no aileron structure.

GB 935,884 discloses a ducted fan flying vehicles which are capable of controlled vertical ascent and of controlled vertical descent relative to the ground with inherent stability in flight.

US 2006/0226281 describes a multicopter comprising:
a fuselage; and
a plurality of rotors arranged at the sides of the fuselage and tiltable with respect to the fuselage. WO-A-2018/075412 describes a multicopter comprising:
a fuselage;
a pair of wings projecting in a cantilever fashion from respective mutually opposite sides of the fuselage;
a plurality of first rotors supported by one of the wings, arranged in alignment along a direction of extension of said wing and having respective first axes inclined to one another; and
a plurality of second rotors supported by the other wing, arranged in alignment along a direction of extension of said wing and having respective second axes inclined to one another.

CN-A-105539835 discloses a composite-wing vertical take-off and landing aircraft which adopts a special vertical power unit and an integral structure design. According to the scheme provided by the invention, the composite-wing vertical take-off and landing aircraft has the advantages that a maximum yaw control moment of the aircraft is largely improved, negative influence of yaw control saturation on aircraft posture control is avoided, and the robustness of the aircraft is improved; furthermore, the technical scheme of a tail boom is beneficial to improvement of the whole performance of the aircraft.

WO-A-2019/126612 discloses an autonomous cargo container retrieval and delivery system, which locates a select cargo container and maneuvers an unmanned aerial vehicle proximate to the container for retrieval. The vehicle positions itself to engage the cargo container using a grasping mechanism, and responsive to engaging the cargo container retracts the cargo container toward the vehicle. As the cargo container is retracted toward the vehicle, weight sensors within the retrieval mechanism sense the weight and the weight distribution of the cargo container, and, can modify the cargo container's location on the vehicle to optimize vehicle flight operations or replace the container on the ground and alert the operator that the cargo container is too heavy or has an improper weight distribution. Upon mating the cargo container with the vehicle, a coupling mechanism latches or secures the cargo container to the vehicle for further flight and/or ground operations.

SUBJECT OF THE INVENTION

The object of the present invention is the construction of an aircraft capable of vertical take-off and landing that enables satisfying the aforementioned need in a simple and inexpensive manner.

The aforesaid object is achieved by the present invention, in so far as it relates to an aircraft capable of vertical take-off and landing.

The present invention also relates to a control method for an aircraft capable of vertical take-off and landing.

BRIEF DESCRIPTION OF DRAWINGS

For a better understanding of the present invention, fourteen-preferred embodiments are described hereinafter, purely by way of non-limitative example and with reference to the accompanying drawings, in which.

PREFERRED EMBODIMENTS OF THE INVENTION

Figure 1:
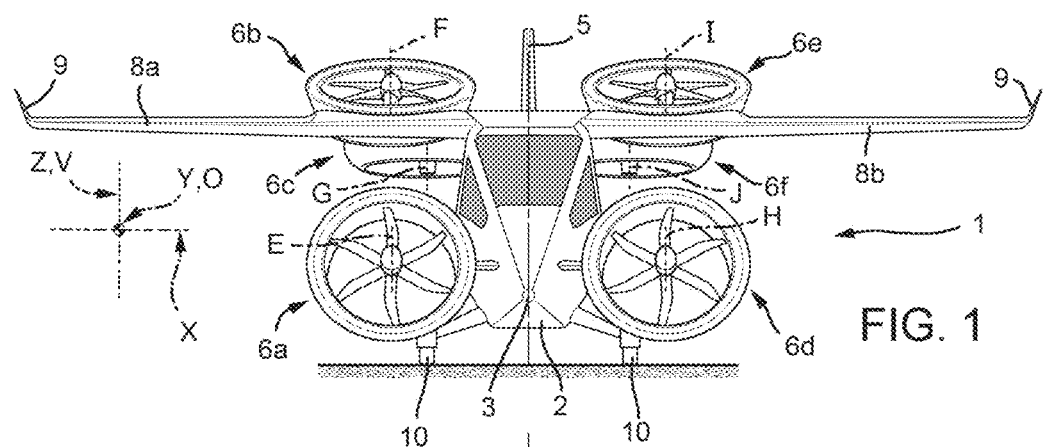
FIG. 1 is a front view of a first embodiment of the aircraft capable of vertical take-off and landing constructed according to the principles of the present invention, in a take-off/landing position.
Figure 2:
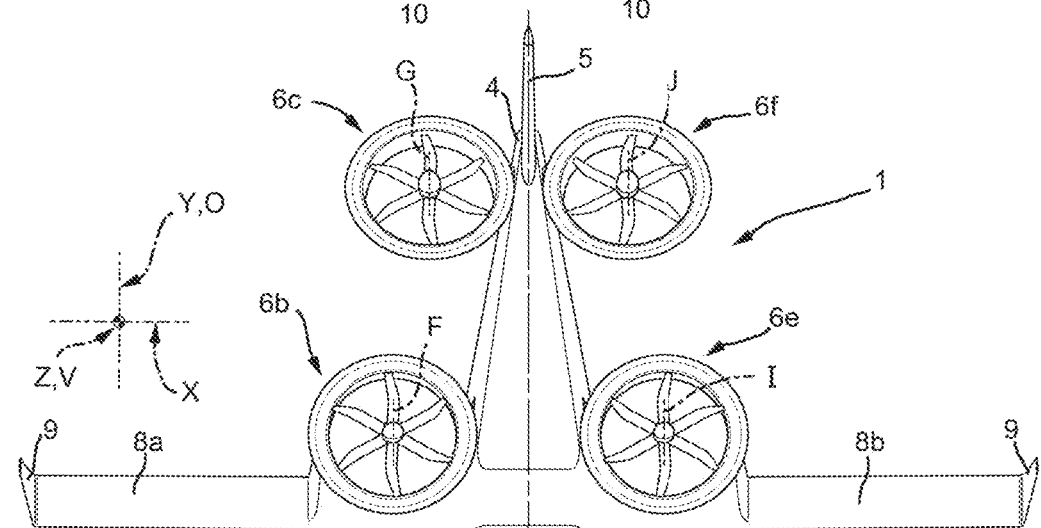
FIG. 2 is a top view of the aircraft of FIG. 1.
Figure 3:
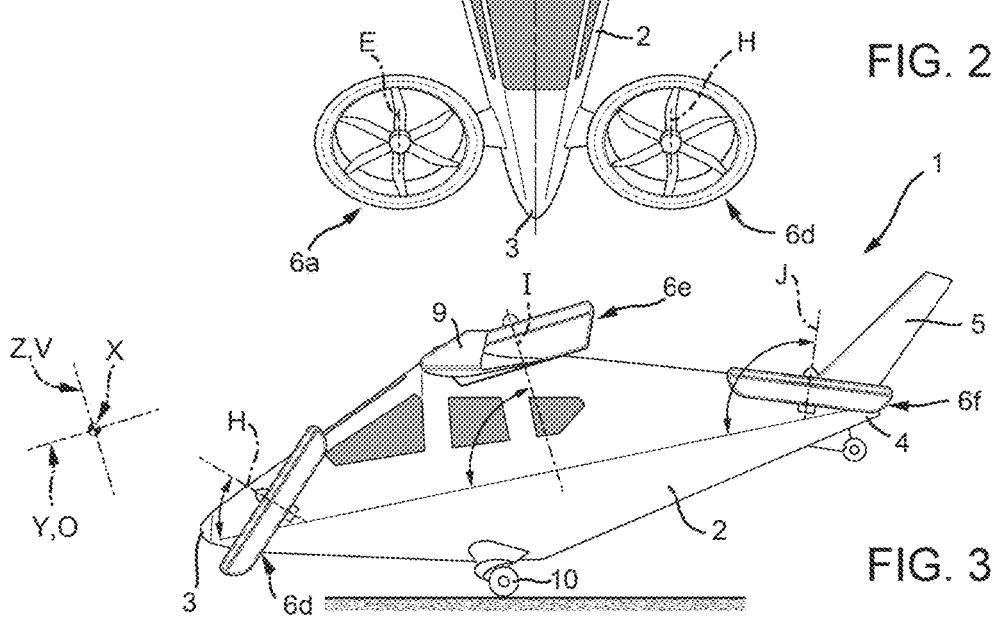
FIG. 3 is a side view of the aircraft of FIGS. 1 and 2.

Referring to FIGS. 1 to 11, reference numeral 1 indicates a vertical take-off and landing aircraft constructed according to a first embodiment of the invention.

More specifically, the aircraft 1 is capable of taking off and landing in a substantially vertical direction and cruising in forward flight like a normal aircraft.

The aircraft 1 is also capable of hovering.

The aircraft 1 is also capable of short take-off/landing.

The aircraft 1 basically comprises:
  a fuselage 2 provided with a nose 3 and a tail 4, opposite to one another;
  a fixed fin 5 projecting in a cantilever fashion from the tail 4 of the fuselage 2; and
  a plurality of rotors 6a, 6b and 6c; 6d, 6e and 6f carried by the fuselage 2.

The aircraft 1 also comprises a pair of wings 8a and 8b arranged at the sides of the fuselage 2 and projecting in a cantilever fashion from the fuselage 2.

It is possible to identify a set of three axes integral with the aircraft 1 and having origins at the barycentre of the aircraft 1, formed by:
  an axis Y parallel to the direction of extension of the fuselage 2;
  an axis X orthogonal to the Y-axis; and
  an axis Z orthogonal to the X-Y axes.

Figure 5:
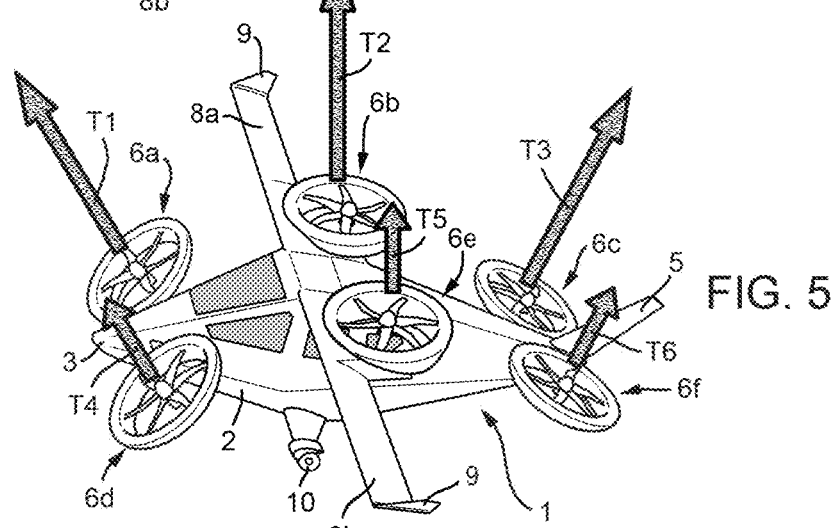
Figure 6:
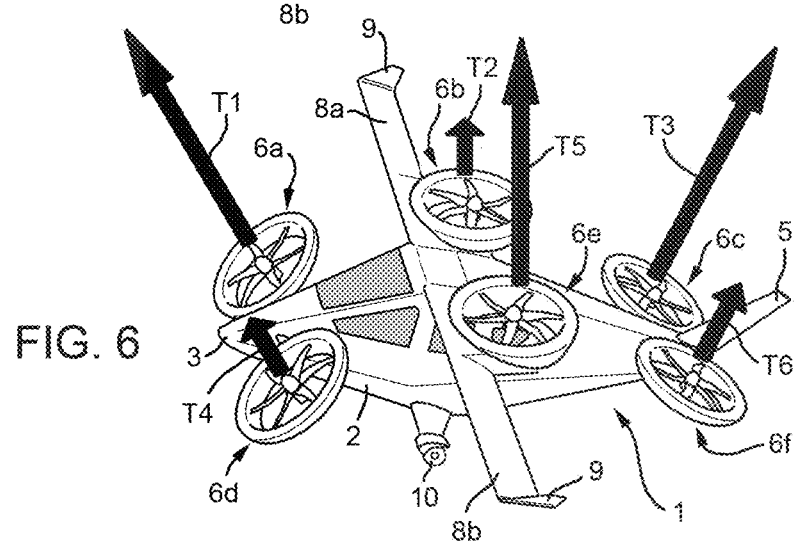
Figure 8:
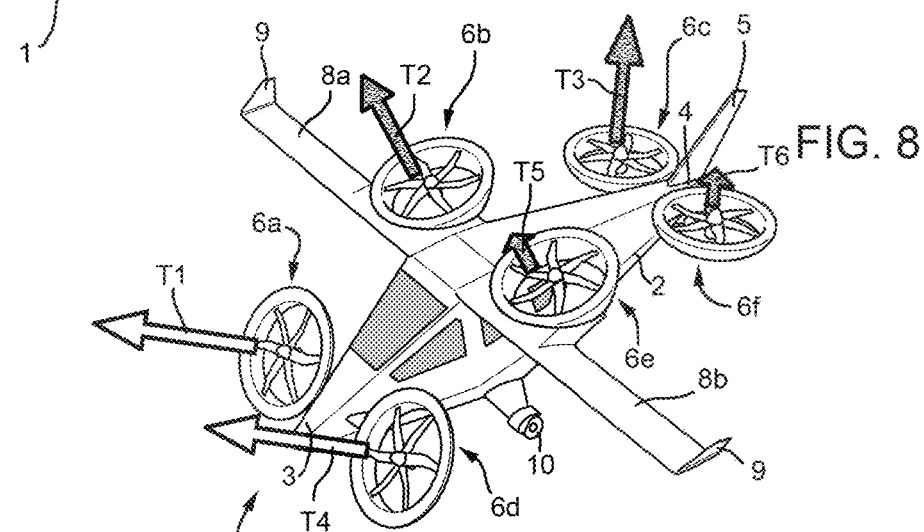
Figure 9:
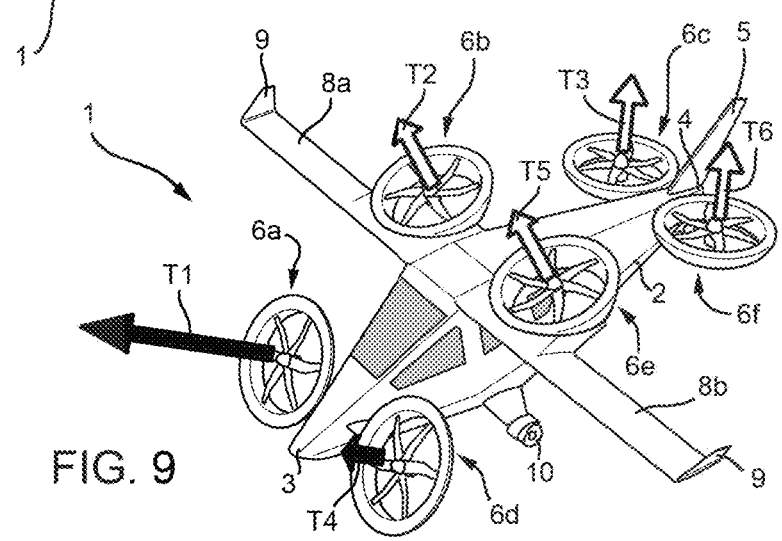

Rotations of the aircraft 1 about the Y-X-Z axes are associated with the following manoeuvres:
  roll, namely rotation about the Y-axis (FIGS. 5 and 8);
  pitch, namely rotation about the X-axis (FIGS. 4 and 7); and
  yaw, namely rotation about the Z-axis (FIGS. 6 and 9).

Figure 10:
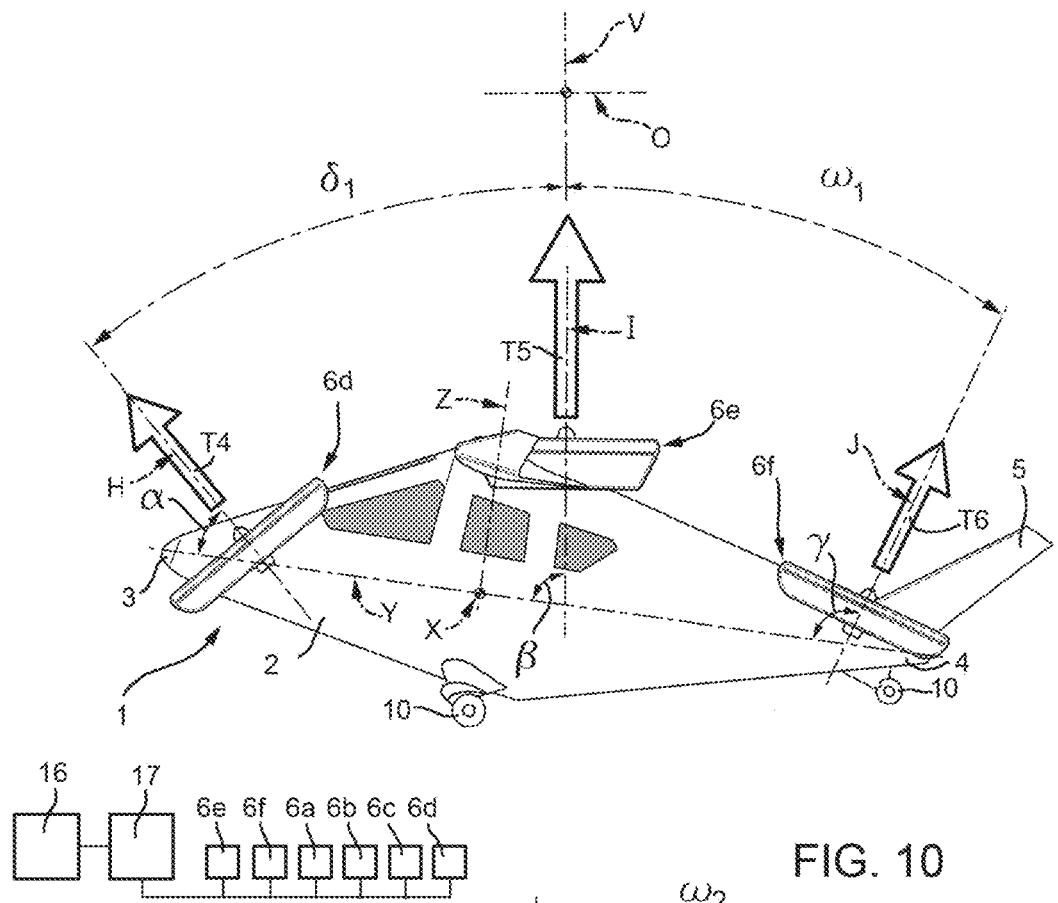
FIG. 10 is a side view of the aircraft of FIGS. 1 to 9 in in a take-off/landing condition.
Figure 11:
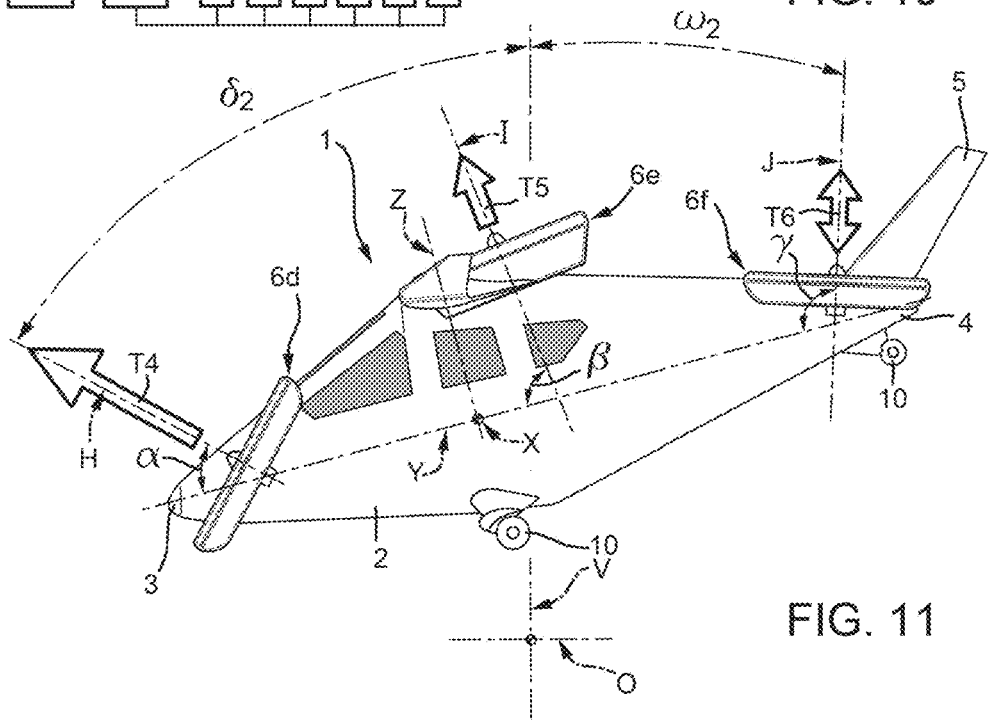
FIG. 11 is a side view of the aircraft of FIGS. 1 to 10 in a forward flight condition.

With particular reference to FIGS. 10 and 11, it is also possible to identify a pair of axes integral with the ground, formed by:
  an axis V arranged vertically and corresponding to a direction of upward/downward movement of the aircraft 1; and
  an axis O arranged horizontally and corresponding to a direction of forward flight of the aircraft 1.

In the case shown, the wings 8a and 8b comprise respective winglets 9, which are arranged at the respective free tips opposite to the fuselage 2.

More specifically, the winglets 9 project from the respective wings 8a and 8b from the part opposite to the fuselage 2, and upwards in the case shown.

The aircraft 1 also comprises a plurality of undercarriages 10 arranged below the fuselage 2 and adapted to rest on the ground prior to take off and subsequently after landing of the aircraft 1.

In particular, rotors 6a, 6b and 6c are arranged on a first side of fuselage 2, while rotors 6d, 6e and 6f are arranged on a second side of the fuselage 2, opposite to the first side.

Even more specifically, with reference to a top view of the aircraft 1 (FIG. 2), rotors 6a, 6b and 6c are arranged on the left side of the fuselage 2, while rotors 6d, 6e and 6f are arranged on the right side of the fuselage 2.

Proceeding from the nose 3 to the tail 4, rotors 6a, 6b and 6c are arranged in the same order.

Similarly, proceeding from the nose 3 to the tail 4, rotors 6d, 6e and 6f are arranged in the same order.

Each rotor 6a, 6b, 6c, 6d, 6e and 6f comprises, in particular:
  a hub 11 rotatable about a respective axis E, F, G, H, I and J; and
  a plurality of blades 12 projecting from the hub 11 in a cantilever fashion, radially to the corresponding axis E, F, G, H, I and J.

The rotors 6a, 6b, 6c, 6d, 6e and 6f are operated independently of one another.

More specifically, the rotors 6a, 6b, 6c, 6d, 6e and 6f generate respective thrusts T1, T2, T3, T4, T5 and T6 adjustable independently of one another.

The thrusts T1, T2, T3, T4, T5 and T6 have respective directions of application, respectively parallel to the axes E, F, G, H, I and J of the corresponding rotors 6a, 6b, 6c, 6d, 6e and 6f.

Axes E and H of rotors 6a and 6d are parallel to each other and define an angle $\alpha$ with the Y-axis.

Similarly, axes F and I of rotors 6b and 6e are parallel to each other and define an angle $\beta$ with the Y-axis.

Axes G and J of rotors 6c and 6f are parallel to each other and define an angle $\gamma$ with the Y-axis.

Thrusts T1 and T4 are parallel to each other and are inclined by angle $\alpha$ with respect to the Y-axis.

Thrusts T2 and T5 are parallel to each other and are inclined by angle $\beta$ with respect to the Y-axis.

Thrusts T3 and T6 are parallel to each other and are inclined by angle $\gamma$ with respect to the Y-axis.

Angles $\alpha$, $\beta$ and $\gamma$ run from the Y-axis to the respective axes E and H of rotors 6a and 6d, axes F and I of rotors 6b and 6e, and axes G and J of rotors 6c and 6f.

In the case shown, angle $\alpha$ is less than angle $\beta$ and angle $\beta$ is less than angle $\gamma$.

Preferably, angles $\alpha$, $\beta$, $\gamma$ are different from one another.

The rotors 6a, 6b, 6c, 6d, 6e and 6f are preferably electrically driven. Alternatively, the rotors 6a, 6b, 6c, 6d, 6e and 6f could be driven by a combustion engine, a hybrid electric-combustion propulsion system or a hydraulic motor.

The rotors 6a, 6b, 6c, 6d, 6e and 6f can be fixed pitch with variable angular velocity, fixed pitch and constant angular velocity, or variable pitch and variable angular velocity.

The axes E, F, G, H, I and J are fixed with respect to the X-Y-Z axes of the aircraft 1 during manoeuvres of the aircraft 1.

In consequence, the directions of application of the related thrusts T1, T2, T3, T4, T5 and T6 remain fixed with respect to the X-Y-Z axes of the aircraft 1.

Contrariwise, the moduli and directions of the thrusts T1, T2, T3, T4, T5 and T6 are adjustable independently of one another.

In this way, it is possible to adjust the modulus and direction of a thrust vector T of the thrusts T1, T2, T3, T4, T5 and T6 applied on the aircraft 1, without rotating the respective rotors 6a, 6b, 6c, 6d, 6e and 6f with respect to the aircraft 1, but by simply adjusting the moduli and the directions of the thrusts T1, T2, T3, T4, T5 and T6.

In the embodiment shown, the rotors 6a, 6b, 6c, 6d, 6e and 6f maintain a fixed position with respect to the X-Y-Z axes.

The aircraft 1 further comprises:
  a control 16 (only schematically shown in FIG. 10) that can be operated by a pilot or autopilot;

a control unit 17 (only schematically shown in FIG. 10) operated by the control 16 and operatively connected to the rotors 6a, 6b, 6c, 6d, 6e and 6f to adjust the modulus and direction of the respective thrusts T1, T2, T3, T4, T5 and T6 to generate the thrust vector T with the desired modulus ad direction.

In this description, by the term "control unit" we mean any mechanical or electronic fly-by-wire system designed to convert the control 16 into a law of regulation for the thrusts T1, T2, T3, T4, T5 and T6 of rotors 6a, 6b, 6c, 6d, 6e and 6f.

In greater detail, the control unit 17 is programmed to generate the thrust vector T so as to allow vertical take-off/landing, hovering, forward flight and any transition between the aforementioned operating conditions of the aircraft 1.

The control unit 17 is programmed to selectively arrange the aircraft 1:
- in a first attitude (FIG. 10), preferably assumed when in take-off/landing conditions and in a hovering condition, and where the thrust vector T is parallel to the V-axis and directed upwards; or
- in a second attitude (FIG. 11), preferably assumed when in forward flight conditions, and where the thrust vector T has a component parallel to the O-axis and directed from the tail towards the nose 3 and a component parallel to the V-axis and directed upwards.

The control unit 17 is also programmed to selectively arrange, based on the control 16, the aircraft 1 in a plurality of intermediate attitudes (not shown) between the first and the second attitudes and where the thrust vector T has a component parallel to the V-axis and a component parallel to the O-axis.

Preferably, the aircraft 1 passes from the first to the second attitude and vice versa by pitching about an axis parallel to the X-axis.

In the case shown, the aircraft 1 passes from the first to the second attitude by a rotation orientated from the tail 4 to the nose 3, i.e. by a nose down manoeuvre.

In particular, the control unit 17 is programmed to arrange and maintain the aircraft 1 in the first attitude through different operational configurations of the rotors 6a and 6b; 6c and 6d; 6e and 6f.

More specifically, in a first operational configuration (FIG. 10):
- rotors 6b and 6e are orientated such that the respective axes F and I are parallel to the direction V, and the respective thrusts T2 and T5 are equal to each other, parallel to the direction V and directed upwards;
- rotors 6a and 6d are orientated such that the respective axes E and H are inclined by an angle 81 with respect to the direction V and the respective thrusts T1 and T4 are equal to each other; and
- rotors 6c and 6f are orientated such that the respective axes G and J are inclined by an angle ol with respect to the direction V and the respective thrusts T3 and T6 are equal to each other.

More specifically, the control unit 17 is programmed to generate the moduli of thrusts T1 and T4; T3 and T6 so that the components of thrusts T1 and T4 parallel to the O-axis are equal and opposite to the components of thrusts T3 and T6 parallel to the O-axis.

The control unit 17 is also programmed to generate the moduli of thrusts T1 and T4; T3 and T6 such that the sum of the components of thrusts T1 and T4; T3 and T6 parallel to the V-axis and of thrusts T2; T5 equals the force parallel to the V-axis necessary to maintain the aircraft 1 in the first attitude.

In a second operational configuration (not shown), thrusts T2 and T5 generated by rotors 6b and 6e are parallel to direction V and rotors 6a and 6d; 6c and 6f are deactivated.

The control unit 17 is also programmed to control the rotors 6a, 6b, 6c, 6d, 6e and 6f and adjust the respective thrusts T1, T2, T3, T4, T5 and T6, so as to control the pitch, roll and yaw of the aircraft 1 arranged in the first attitude, according to the non-limitative methods described below by way of example.

Figure 4:
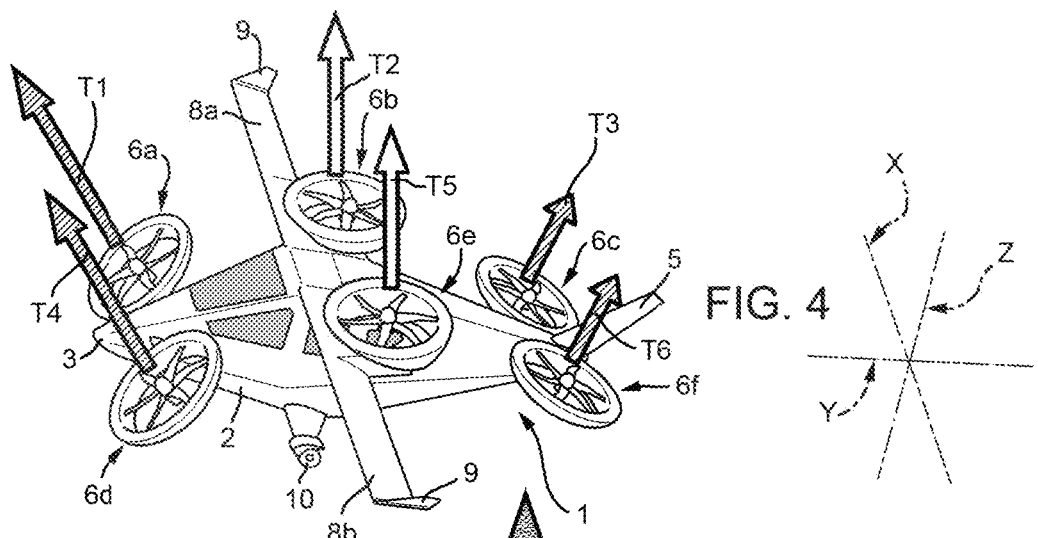
FIGS. 4 to 6 are perspective views of the aircraft of FIGS. 1 to 3 during the execution of respective flight manoeuvres in a hovering condition.

Referring to FIG. 4, the control unit 17 is programmed to control the pitch of the aircraft 1 in the first attitude by increasing (decreasing) thrusts T1 and T4 (T3 and T6) of rotors 6a and 6d (6c and 6f) and decreasing (increasing) thrusts T3 and T6 (T1 and T4) of rotors 6c and 6f (6a and 6d). In this way, a pitch moment is generated about the X-axis.

Referring to FIG. 5, the control unit 17 is programmed to control the roll of the aircraft 1 arranged in the first attitude by increasing (decreasing) thrusts T1, T2 and T3 (T4, T5 and T6) of rotors 6a, 6b and 6c (6d, 6e and 6f). In this way, a roll moment is generated about the Y-axis.

Referring to FIG. 6, the control unit 17 is programmed to control the yaw of the aircraft 1 arranged in the first attitude by increasing (decreasing) thrusts T1, T3 and T5 (T2, T4 and T6) of rotors 6a, 6c and 6e (6b, 6d and 6f). In this way, a yaw moment is generated about the Z-axis.

The control unit 17 is also programmed to arrange the aircraft 1 in the second attitude through different operational configurations of rotors 6a and 6b; 6c and 6d; 6e and 6f.

More specifically, in a third operational configuration (FIG. 11):
- rotors 6a and 6d are orientated such that the respective axes E and H are inclined with respect to the V-axis by respective angles 82 equal to each other and generate respective thrusts T1 and T4 equal to each other, having the same moduli, having first components parallel to the O-axis directed from the tail 4 towards the nose 3 and first components parallel to the V-axis directed upwards;
- rotors 6b and 6e are orientated such that the respective axes F and I are inclined with respect to the V-axis by second angles greater than the corresponding angles @2 of the axes G, J of rotors 6c and 6f and generate respective thrusts T2 and T5 equal to each other, having the same moduli and having second components parallel to the O-axis directed from the tail 4 towards the nose 3 and second components parallel to the V-axis and directed upwards; and
- rotors 6c and 6f are orientated such that the respective axes G and J and the respective thrusts T3 and T6 are parallel to the V-axis.

In the case shown, thrusts T1 and T4 are greater in modulus than thrusts T2 and T5.

The control unit 17 is programmed to control the rotors 6a, 6b, 6c, 6d, 6e and 6f and adjust the respective thrusts T1, T2, T3, T4, T5 and T6 so as to control the pitch, roll and yaw of the aircraft 1 arranged in the second attitude (FIGS. 7, 8 and 9), according to the non-limitative methods described below by way of example.

Figure 7:
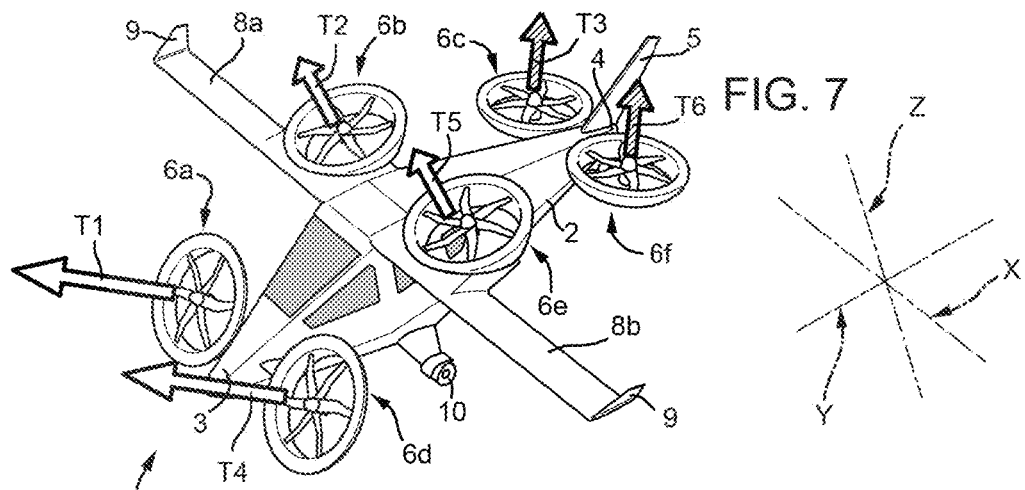
FIGS. 7 to 9 are perspective views of the aircraft of FIGS. 1 to 3 during the execution of respective flight manoeuvres in a forward flight condition.

Referring to FIG. 7, the control unit 17 is programmed to control the pitch of the aircraft 1 in the second attitude by increasing (decreasing) thrusts T3 and T6 (T1 and T4) of rotors 6c and 6f (6a and 6d) and decreasing (increasing) thrusts T1 and T4 (T3 and T6) of rotors 6a and 6d (6c and 6f). In this way, a pitch moment is generated about the X-axis.

Referring to FIG. 8, the control unit 17 is programmed to control the roll of the aircraft 1 arranged in the second attitude by increasing (decreasing) thrusts T2 and T3 (T5 and T6) of rotors 6b and 6c (6e and 6f). In this way, a roll moment is generated about the Y-axis.

Referring to FIG. 9, the control unit 17 is programmed to control the yaw of the aircraft 1 arranged in the second attitude by increasing (decreasing) thrusts T1 (T4) of rotors 6a, (6d). In this way, a roll moment is generated about the Z-axis.

The operation of the aircraft 1 is described starting from a condition in which it is in the first attitude (FIG. 10), for example in the take-off or hovering phase.

In this condition, the rotors 6a, 6b, 6c, 6d, 6e and 6f are controlled such that the thrust vector T of the respective thrusts T1, T2, T3, T4, T5 and T6 is substantially parallel to the V-axis.

For example, in this condition, the control unit 17 controls the thrusts T1, T2, T3, T4, T5 and T6 of rotors 6a, 6b, 6c, 6d, 6e and 6f according to the previously described first or second configurations.

In this first attitude, the control unit 17 controls the pitch, roll and yaw by adjusting the thrusts T1, T2, T3, T4, T5 and T6 of the respective rotors 6a, 6b, 6c, 6d, 6e and 6f, so as to generate respective moments about the X-Y-Z axes, for example, as shown in the respective FIGS. 4, 5 and 6, and previously described.

In one embodiment of the present invention, the aircraft 1 passes from the first attitude (FIG. 10) to the second attitude (FIG. 11) by inclining about the X-axis, i.e. by the application of a moment about the X-axis.

This moment generates nose-down on the aircraft 1, i.e. a lowering of the nose 3 and a raising of the tail 4.

At this point, the aircraft 1 is in the second attitude and the wings 8a and 8b generate, depending on the forward speed of the aircraft 1, a certain direct lift value parallel to the V-axis.

In this condition, the rotors 6a, 6b, 6c, 6d, 6e and 6f are controlled such that the thrust vector T of the respective thrusts T1, T2, T3, T4, T5 and T6 has a component parallel to the O-axis that generates a forward thrust on the aircraft and a component parallel to the V-axis and equal to the weight of the aircraft 1, which together with the lift generated by the wings 8a and 8b enables sustaining flight.

For example, in this condition, the control unit 17 controls the thrusts T1, T2, T3, T4, T5 and T6 of rotors 6a, 6b, 6c, 6d, 6e and 6f according to the previously described third or fourth configurations.

In this second attitude, the control unit 17 controls the pitch, roll and yaw by adjusting the thrusts T1, T2, T3, T4, T5 and T6 of the respective rotors 6a, 6b, 6c, 6d, 6e and 6f, so as to generate respective moments about the X-Y-Z axes, for example, as shown in the respective FIGS. 7, 8 and 9, and previously described.

When it is necessary to return the aircraft 1 to the first attitude, the control unit 17 first generates a moment about the X-axis that causes nose-up on the aircraft 1, i.e. a raising of the nose 3 and a lowering of the tail 4, until the condition shown in FIG. 10 is reached.

After this, the control unit 17 controls the rotors 6a, 6b, 6c, 6d, 6e and 6f such that the thrust vector T is again directed parallel to the V-axis and the aircraft 1 is again in the first attitude, in which it can land.

Figure 12:
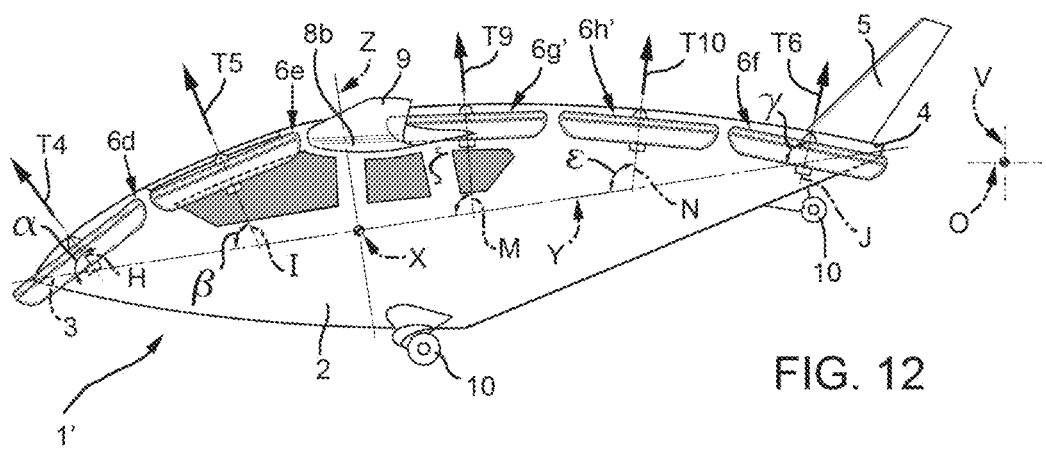
FIGS. 12 and 13 are a front view and a top view, respectively, of a second embodiment of the aircraft capable of vertical take-off and landing according to the invention.
Figure 13:
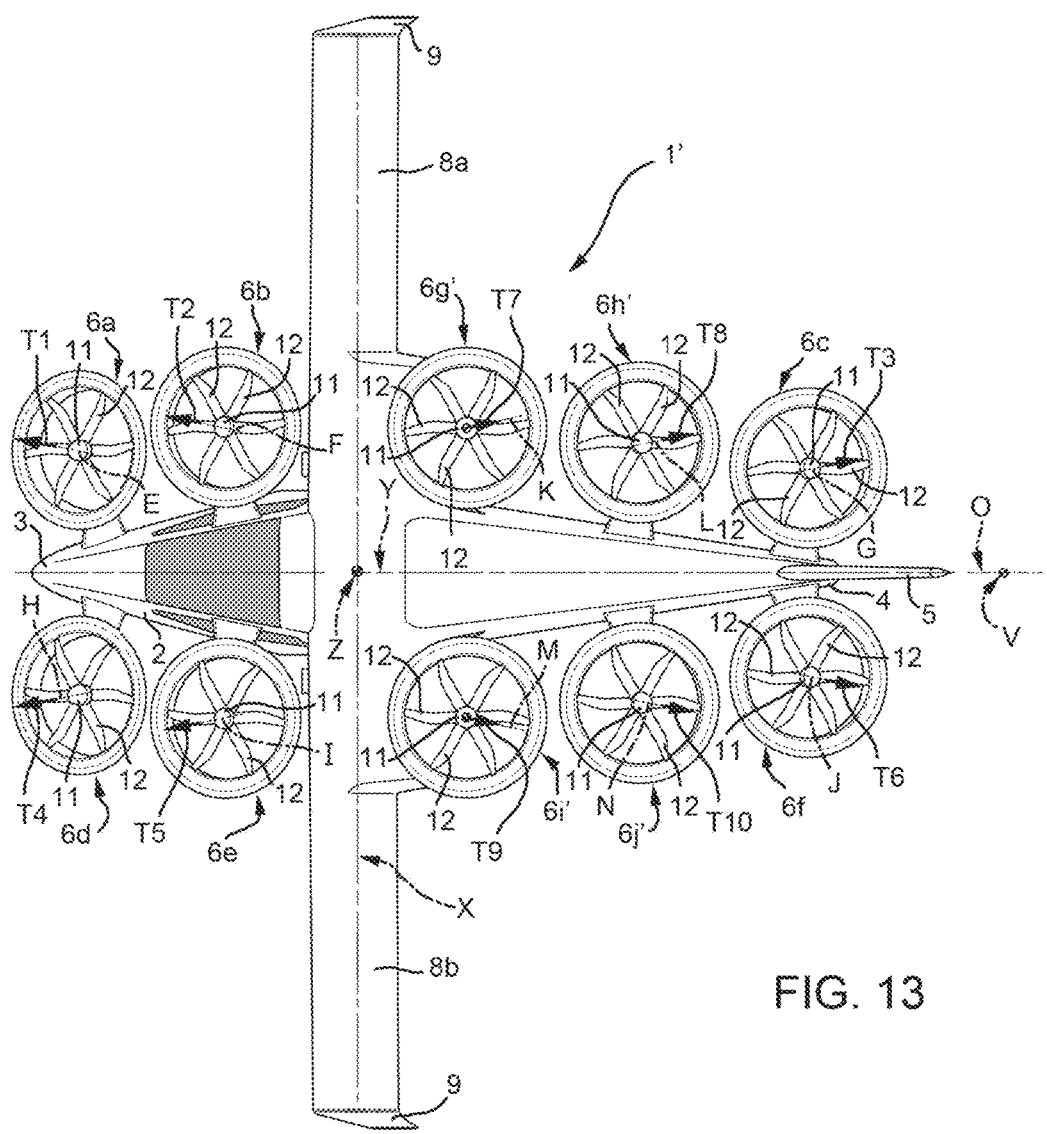

Referring to FIGS. 12 and 13, reference numeral 1' indicates an aircraft capable of vertical take-off and landing according to a second embodiment of the present invention.

Aircraft 1' is similar to aircraft 1 and only the differences from the latter will be described hereinafter; identical or equivalent parts of the aircraft 1, 1' will be marked, where possible, with the same reference numerals.

In particular, aircraft 1' differs from aircraft 1 in that it comprises two further rotors 6g' and 6h' arranged on the first side of the fuselage 2 and two further rotors 6i' and 6j' arranged on the second side of the fuselage 2.

Rotors 6g' and 6h' generate respective thrusts T7 and T8 directed along respective axes K and L and rotors 6i' and 6j' generate respective thrusts T9 and T10 directed along respective axes M and N.

In greater detail, rotors 6g' and 6h' (6i' and 6j') are interposed between rotors 6b and 6c (6e and 6f) parallel to the Y-axis.

Thrusts T7 and T9 are parallel to each other and are inclined by angle (with respect to the Y-axis.

Thrusts T8 and T10 are parallel to each other and are inclined by angle & with respect to the Y-axis.

The angles (and & run from the Y-axis to the respective axes K and L of rotors 6g' and 6h' and axes M and N of rotors 6i' and 6j'.

In the case shown, the angles α, β, ξ, ε and γ progressively increase proceeding from the nose 3 towards the tail 4 of the aircraft 1'.

The control unit 17 is programmed to adjust the first thrusts generated by rotors 6g' and 6h' along the respective axes K and L and the second thrusts generated by rotors 6i' and 6j' along the respective axes M and N independently of one another and independently of thrusts T1, T2, T3, T4, T5 and T6.

The operation of aircraft 1' is similar to the operation of aircraft 1 and therefore is not described in detail.

Figure 14:
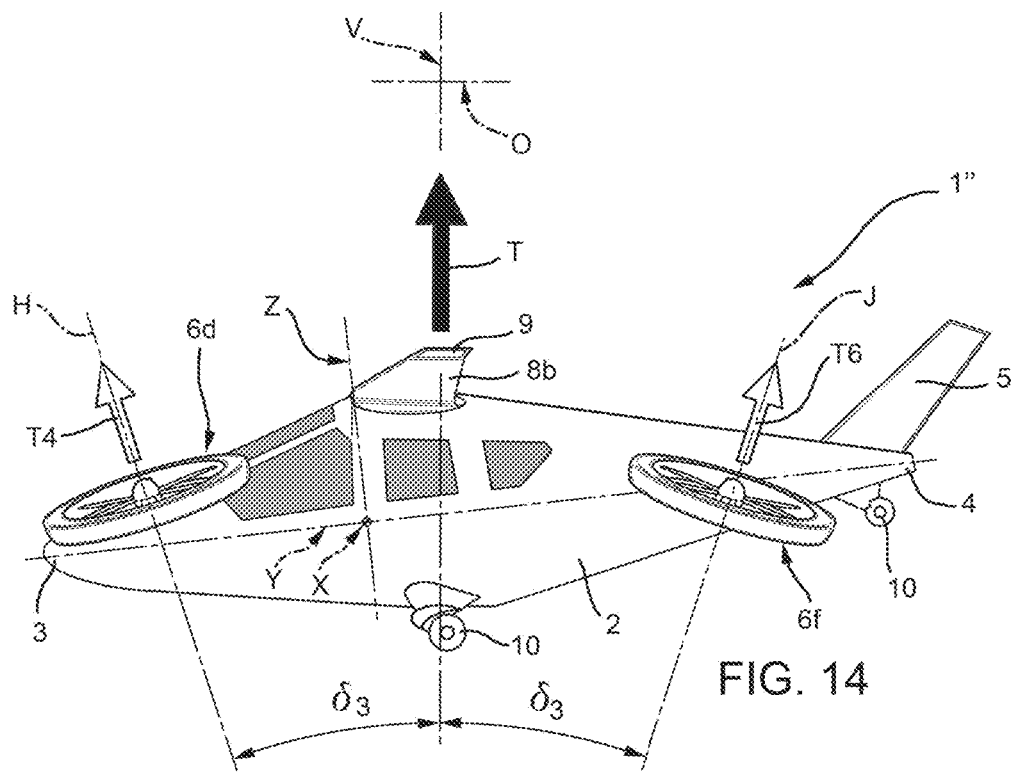
FIGS. 14 and 15 are side views in a hovering condition and in a forward flight condition, respectively, of a third embodiment of the aircraft capable of vertical take-off and landing, which is shown only for illustrative purposes.
Figure 15:
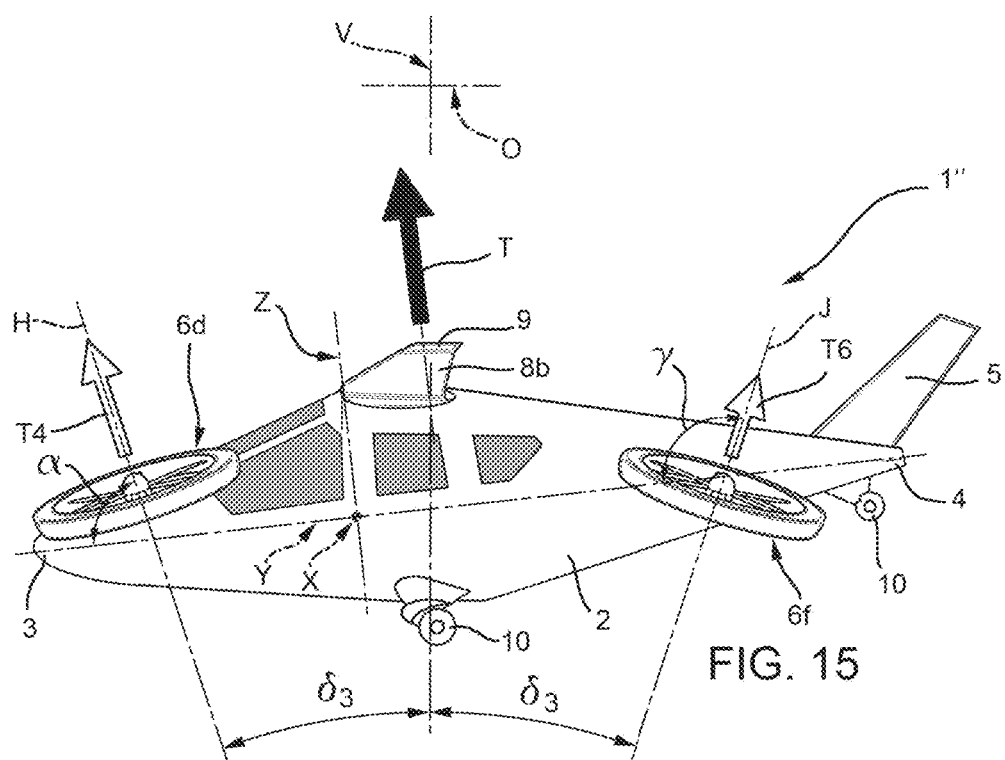

Referring to FIGS. 14 and 15, reference numeral 1" indicates an aircraft capable of vertical take-off and landing according to a third embodiment, which is shown only for illustrative purposes.

Aircraft 1" differs from aircraft 1 in that it does not comprise rotors 6b and 6e and therefore comprises only the two rotors 6a and 6c arranged on the first side of the fuselage 2 and only two rotors 6d and 6f arranged on the second side of the fuselage 2.

The operation of aircraft 1" differs from the operation of aircraft 1 in that when aircraft 1" is in the first attitude (FIG. 14):

rotors 6a and 6d are orientated such that the respective axes E and H are inclined by an angle δ3 with respect to the V-axis and the respective thrusts T1 and T4 are equal to each other; and rotors 6c and 6f are orientated such that the respective axes G and J are inclined by the same angle 83 with respect to direction V and the respective thrusts T3 and T6 are equal to each other, equal in modulus of thrusts T1 and T4 and symmetrical to thrusts T1 and T4 with respect to the V-axis.

In particular, thrusts T1 and T4, and T3 and T6, have respective components parallel to the O-axis equal and opposite to one another.

The control unit 17 is programmed to generate thrusts T1 and T4, and T3 and T6, such that the sum of the respective components parallel to the V-axis equals the force parallel to the V-axis necessary to maintain the aircraft 1" in the first attitude.

Furthermore, the operation of aircraft 1" differs from the operation of aircraft 1 in that when aircraft 1" is in the second attitude (FIG. 15):

rotors 6a and 6d are orientated such that the respective axes E and H generate respective thrusts T1 and T4 equal to each other, having the same moduli, having first components parallel to the O-axis directed from the tail 4 towards the nose 3 and second components parallel to the V-axis directed upwards; and rotors 6c and 6f are orientated such that the respective axes G and J generate respective thrusts T3 and T6 equal to each other, having the same moduli, having second components parallel to the O-axis directed from the nose 3 towards the tail 4 and second components parallel to the V-axis directed upwards.

The aforementioned first components parallel to the O-axis are opposed to each other and their algebraic sum corresponds to the component of the thrust vector T parallel to the O-axis, which provides the thrust necessary for forward flight of the aircraft 1". Contrariwise, the aforementioned second components parallel to the V-axis are concordant and their algebraic sum corresponds to the component of the thrust vector T parallel to the V-axis that enables sustaining the aircraft 1", together with the lift provided by the wings 8a and 8b during forward flight.

Preferably, the control unit 17 is programmed to generate thrusts T1 and T4 with a larger modulus than thrusts T3 and T6.

Figure 16:
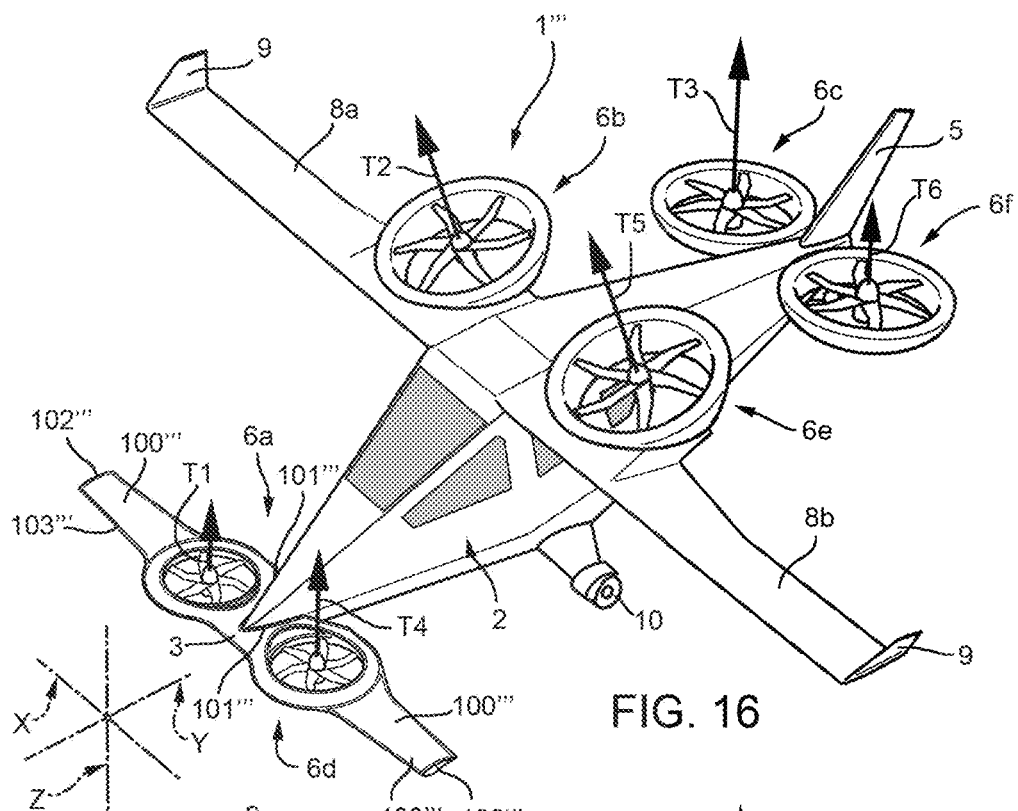
FIG. 16 is a perspective view of a fourth embodiment of the aircraft capable of vertical take-off and landing according to the invention.

Referring to FIG. 16, reference numeral 1''' indicates an aircraft capable of vertical take-off and landing, according to a fourth embodiment of the present invention.

Aircraft 1''' is similar to aircraft 1 and only the difference from the latter will be described hereinafter; identical or equivalent parts of aircraft 1, 1''' will be marked, where possible, with the same reference numbers.

Aircraft 1''' differs from aircraft 1 for assuming a canard arrangement.

In greater detail, aircraft 1''' comprises a pair of aerodynamic surfaces 100''' laterally protruding respective sides of fuselage 2.

Aerodynamic surfaces 100''' protrude from nose 3 of fuselage 2.

Aerodynamic surfaces 100''' have a length parallel to axis X, which is smaller than the length of corresponding wings 8a, 8b parallel to axis X.

Rotors 6a, 6d are arranged at respective aerodynamic surfaces 100'''.

In particular, each aerodynamic surface 100''' comprises:
a root end 101''' connected to nose 3;
a free end 102''' opposite to respective root end 101'''; and
a main portion 103''' extending between respective ends 101''', 102'''.

Rotors 6a, 6d are arranged at main portions 103''' of respective aerodynamic surfaces 100'''.

In the embodiment shown in FIG. 16, rotors 6a, 6d are shrouded.

The operation of aircraft 1''' is similar to the one of aircraft 1 and is therefore not described in detail.

Figure 17:
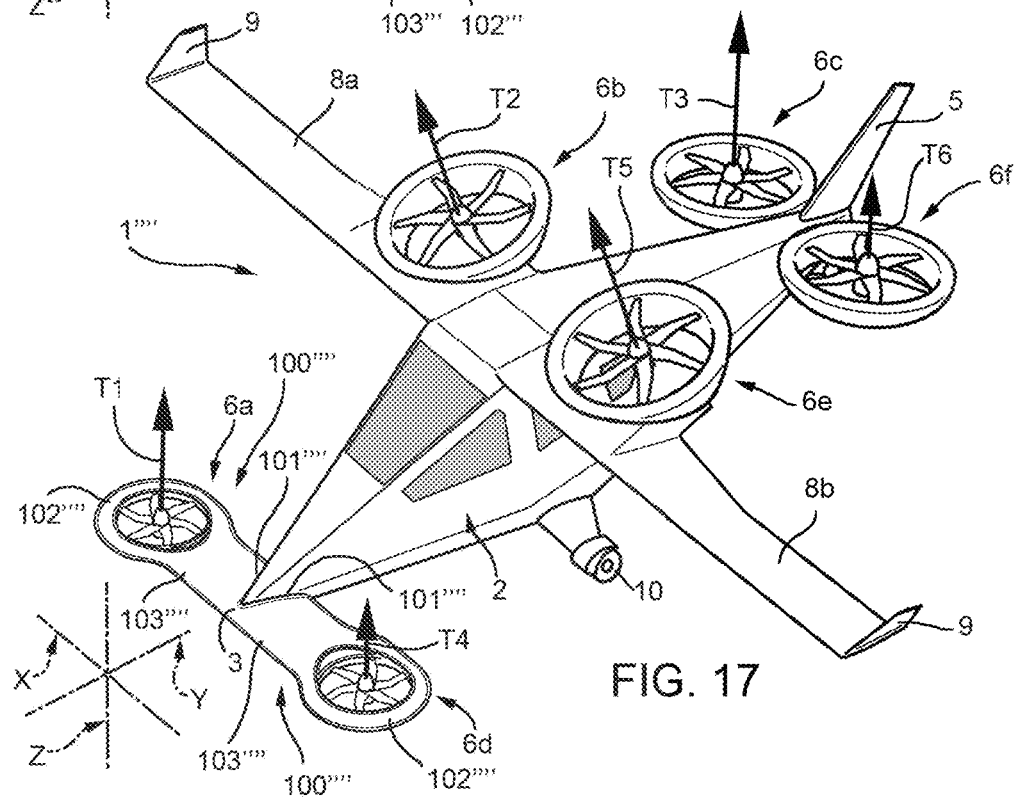
FIG. 17 is a perspective view of a fifth embodiment of the aircraft capable of vertical take-off and landing according to the invention.

Referring to FIG. 17, reference numeral 1'''' indicates an aircraft capable of vertical take-off and landing, according to a fifth embodiment of the present invention.

Aircraft 1'''' is similar to aircraft 1''' and only the difference from the latter will be described hereinafter; identical or equivalent parts of aircraft 1''', 1'''' will be marked, where possible, with the same reference numbers—for example, 100'''', 101''', 102", 103''' of aircraft 1''' and 100'''', 101'''', 102'''', 103'''' of aircraft 1'''', respectively.

Aircraft 1'''' differs from aircraft 1''' in that rotors 6a, 6d are arranged at free ends 102'''' of respective aerodynamic surfaces 100''''.

Figure 18:
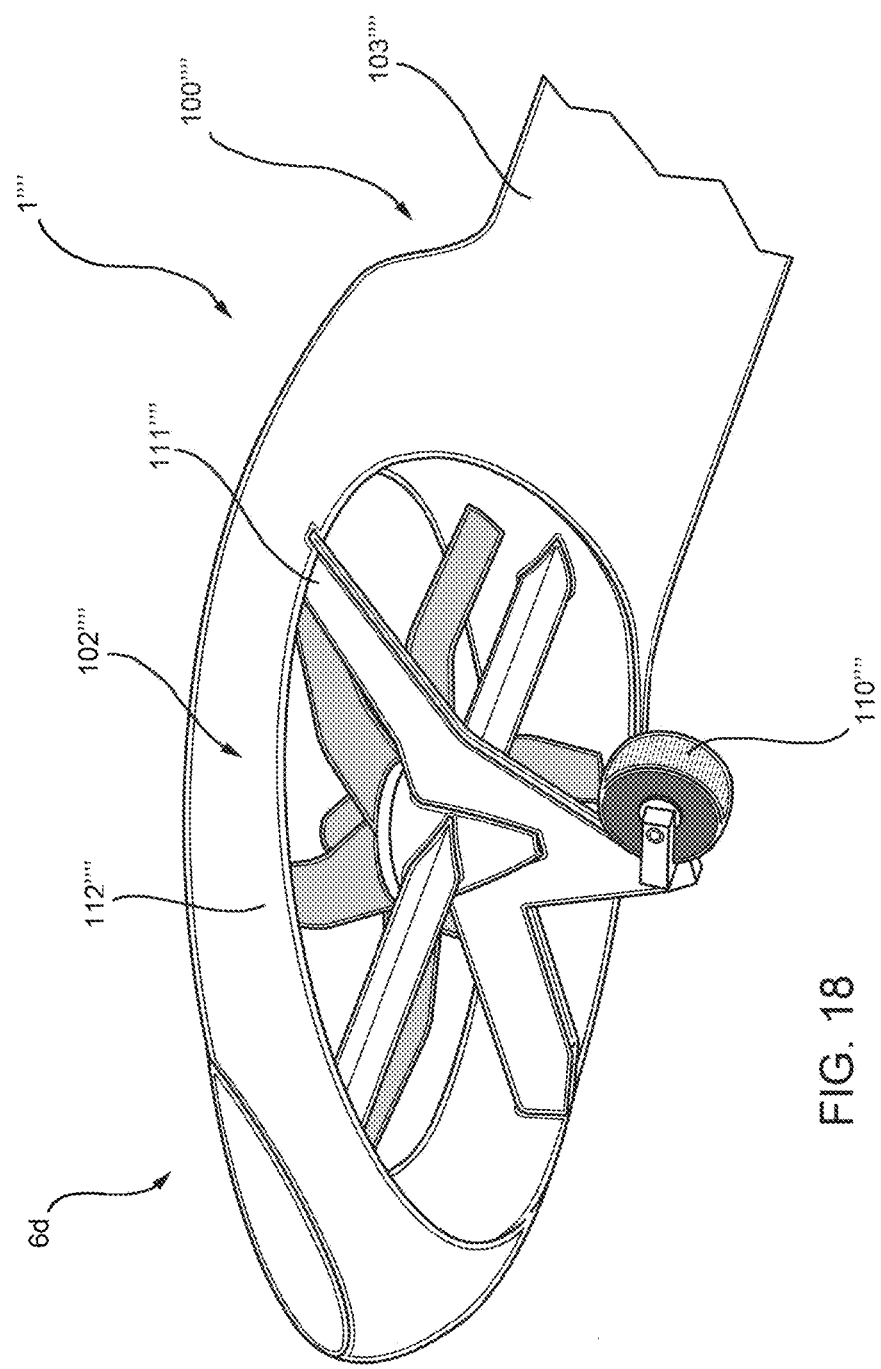
FIG. 18 is a perspective view in an enlarged scale and taken from the bottom of some components of the aircraft capable of vertical take-off and landing of FIG. 17.

Referring to FIG. 18, aircraft 1'''' comprises a pair of additional front undercarriages 110'''' supported by respective aerodynamic surfaces 100''.

In particular, aircraft 1'''' comprises a pair of frames 111'''' connected to respective shrouds 112'''' of respective rotors 6a, 6d and arranged at respective free ends 102'''' of corresponding aerodynamic surfaces 100''''.

Each frame 111'''' supports a respective undercarriage 110'''' below respective shroud 112''''

Alternatively, in a different solution not shown in the Figures, the undercarriage 110'''' comprises a skid type with a wheel included in the structure of said skid.

Undercarriage 110'''' can be similar to the one of conventional aircraft, such as for example: tail-gear, quadricycle, tricycle or multi-wheel bogie undercarriage.

The operation of aircraft 1'''' is similar to the one of aircraft 1''' and is therefore not described in detail.

Figure 19:
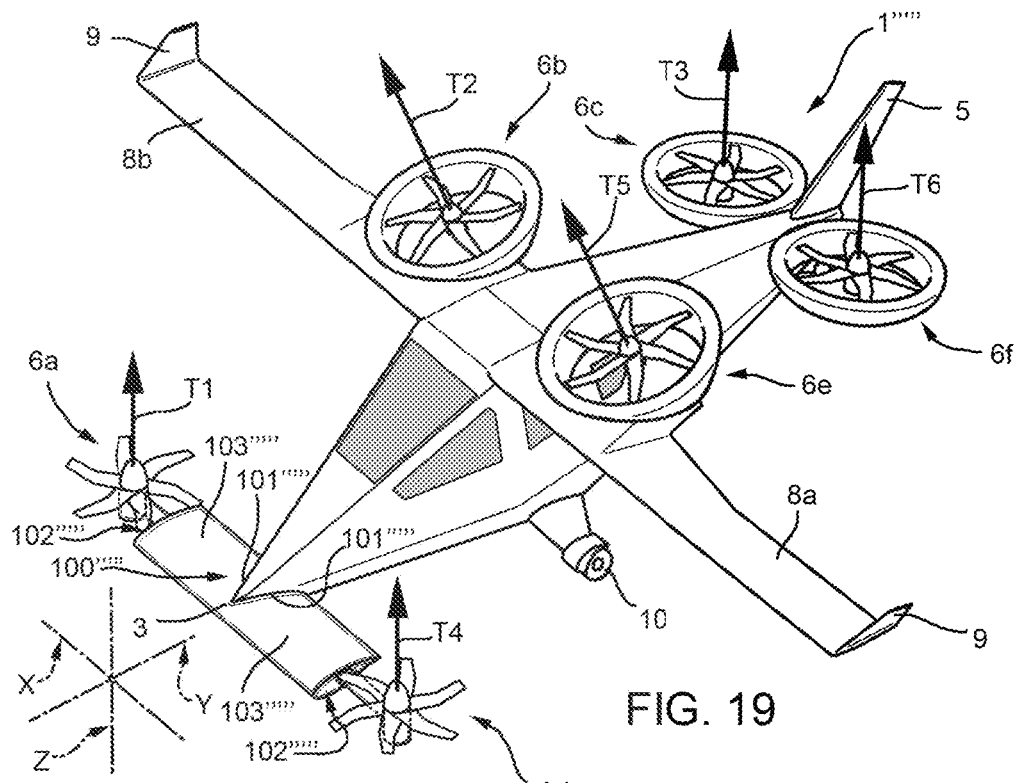
FIG. 19 is a perspective view of a sixth embodiment of the aircraft capable of vertical take-off and landing according to the invention.

Referring to FIG. 19, reference numeral 1''''' indicates an aircraft capable of vertical take-off and landing, according to a sixth embodiment of the invention.

Aircraft 1''''' differs from aircraft 1'''' and only the difference between aircraft 1'''', 1''''' will be described hereinafter; identical or equivalent parts of aircraft 1'''', 1''''' will be marked, where possible, with the same reference numbers—for example, 100'''', 101'''', 102'''', 103'''' of aircraft 1'''' and 100''''', 101''''', 102''''', 103''''' of aircraft 1''''', respectively.

Aircraft 1''''' differs from aircraft 1'''' in that rotors 6a, 6d carried by respective ends 102''''' are not shrouded.

Furthermore, aircraft 1''''' differs from aircraft 1'''' in that ends 102''''' are planar and lie in respective planes orthogonal to axis X.

The operation of aircraft 1''''' is similar to the one of aircraft 1'''' and is therefore not described in detail.

Figure 20:
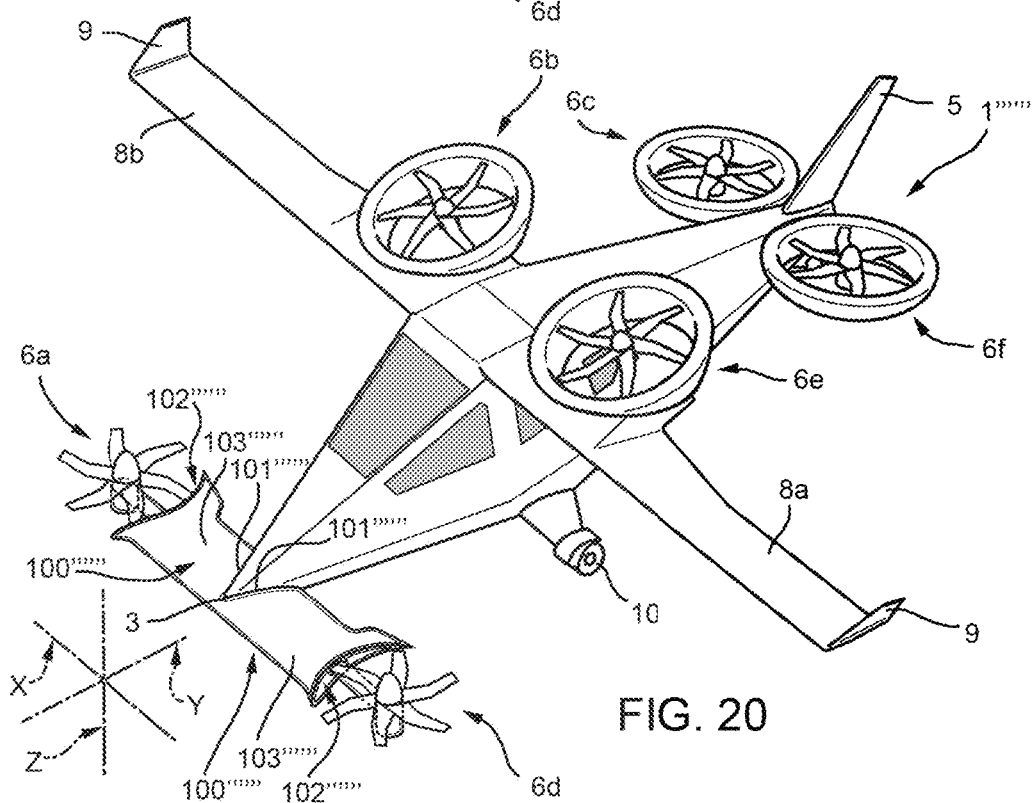
FIG. 20 is a perspective view of a seventh embodiment of the aircraft capable of vertical take-off and landing according to the invention.

Referring to FIG. 20, reference numeral 1'''''' indicates an aircraft capable of vertical take-off and landing, according to a seventh embodiment of the present invention.

Aircraft 1'''''' is similar to aircraft 1''''' and only the difference between aircraft 1''''', 1'''''' will be described hereinafter; identical or equivalent parts of aircraft 1''''', 1'''''' will be marked, where possible, with the same reference numbers—for example, 100''''', 101''''', 102", 103" of aircraft 1''''' and 100'''''', 101'''''', 102'''''', 103'''''' of aircraft 1'''''', respectively.

Aircraft 1'''''' differs from aircraft 1''''' in that ends 102'''''' have surfaces such as fairings on the opposite side of fuselage 2. In detail, the fairings can be a portion of the shroud of the aircraft 1'''' shown in FIG. 17 or can be a partial casing for the respective rotors 6a, 6d. Moreover, the fairings can be shaped as a concave surface in order to partially wrap the rotor 6a, 6d area evenly.

The operation of aircraft 1'''''' is similar to the one of aircraft 1''''' and is therefore not described in detail.

Figure 21:
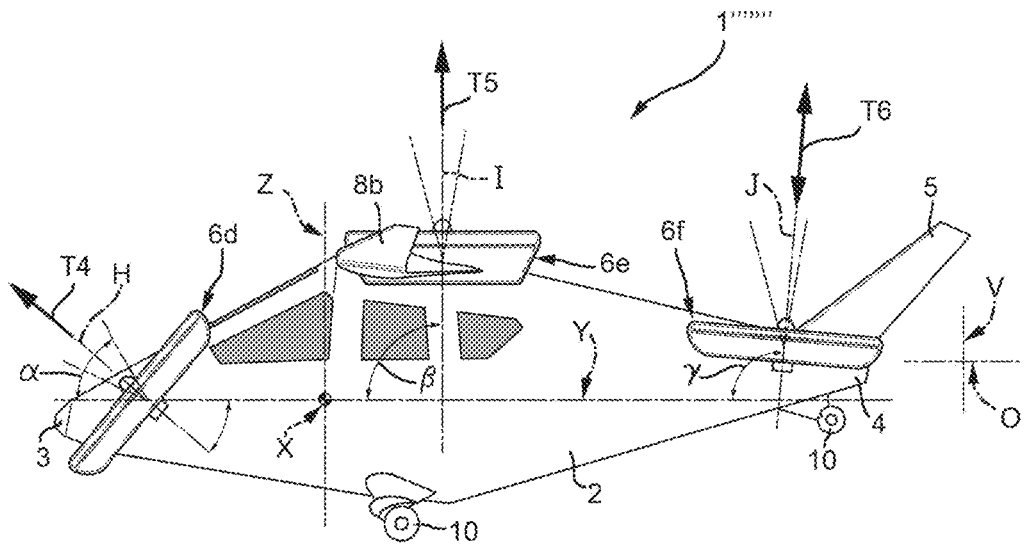
FIGS. 21 to 25 are respective side views of a respective eight, ninth, tenth, eleventh, twelfth embodiment of the aircraft capable of vertical take-off and landing according to the invention.

Referring to FIG. 21, reference numeral 1''''''' indicates an aircraft capable of vertical take-off and landing, according to an eight embodiment of the present invention.

Aircraft 1''''''' is similar to aircraft 1 and only the difference between aircraft 1''''''', 1 will be described hereinafter; identical or equivalent parts of aircraft 1''''''', 1 will be marked, where possible, with the same reference numbers.

Aircraft 1'''' differs from aircraft 1 in that angle α ranges between 25 and 60 degrees, and is preferably 40 degrees.

Furthermore, angle β ranges between 75 and 105 degrees, and is preferably 90 degrees.

Finally, angle γ ranges between 75 and 100 degrees, and is preferably 95 degrees.

Preferably, angles α, β, γ are chosen in respective ranges, in such a way to be different from one another.

Preferably, rotors 6b, 6e are disposed on an upper part of the fuselage 2. In detail, wings 8a, 8b protrude from respective sides of fuselage 2 on an upper part of the said fuselage 2 with respect to axis Z. As a further detail, preferably each wing 8a, 8b is configured to hold, at least partially, respective rotors 6e and 6b.

The operation of aircraft 1''' is similar to the one of aircraft 1 and is therefore not described in detail.

Figure 22:
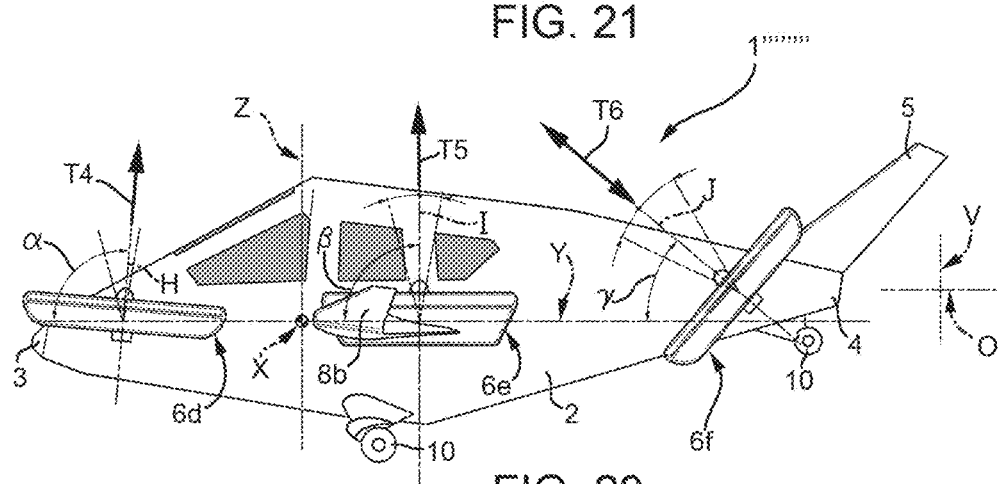

Referring to FIG. 22, reference numeral 1''''''' indicates an aircraft capable of vertical take-off and landing, according to a ninth embodiment of the present invention.

Aircraft 1'''' is similar to aircraft 1 and only the difference between aircraft 1'''''', 1 will be described hereinafter; identical or equivalent parts of aircraft 1''''''', 1 will be marked, where possible, with the same reference numbers.

Aircraft 1'''' differs from aircraft 1 in that angle α ranges between 75 and 100 degrees, and is preferably 95 degrees.

Furthermore, angle β ranges between 75 and 100 degrees, and is preferably 90 degrees.

Angle γ ranges between 25 and 65 degrees, and is preferably 45 degrees.

Preferably, angles α, β, γ are chosen in respective ranges, in such a way to be different from one another.

Finally, wings 8a, 8b protrude from median portion of respective sides of fuselage 2.

Preferably, rotors 6b, 6e are disposed on an upper part of the fuselage 2. In detail, wings 8a, 8b protrude from respective sides of fuselage 2 on an upper part of the fuselage 2 with respect to axis Z. As a further detail, preferably each wing 8a, 8b is configured to hold, at least partially, respective rotors 6e and 6b.

The operation of aircraft 1'''''' is similar to the one of aircraft 1 and is therefore not described in detail.

Figure 23:
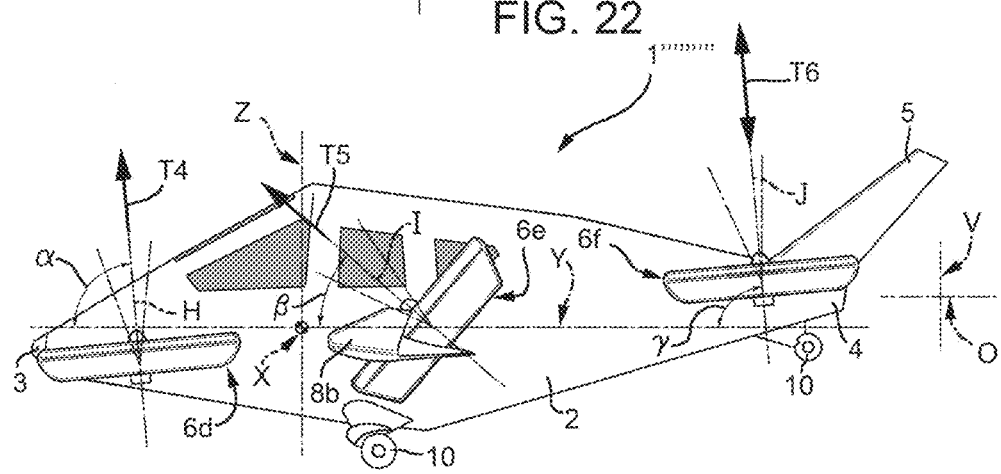

Referring to FIG. 23, reference numeral 1'''''''' indicates an aircraft capable of vertical take-off and landing, according to a tenth embodiment of the present invention.

Aircraft 1''' is similar to aircraft 1 and only the difference between aircraft 1''''''', 1 will be described hereinafter; identical or equivalent parts of aircraft 1''''''', 1 will be marked, where possible, with the same reference numbers.

Aircraft 1'''''' differs from aircraft 1 in that angle α ranges between 70 and 95 degrees, and is preferably 85 degrees.

Furthermore, angle β ranges between 25 and 55 degrees, and is preferably 40 degrees. Angle γ ranges between 65 and 95 degrees, and is preferably 85 degrees.

Preferably, angles α, β, γ are chosen in respective ranges, in such a way to be different from one another.

Preferably, rotors 6b, 6e are disposed in a close position to the Y-axis.

Finally, wings 8a, 8b protrude from respective sides of fuselage 2. In detail, wings 8a, 8b protrude from respective sides of fuselage 2 in a close position to the Y-axis. Preferably, each wing 8a, 8b is configured to hold, at least partially, respective rotors 6e and 6b.

The operation of aircraft 1'''''' is similar to the one of aircraft 1 and is therefore not described in detail.

Figure 24:
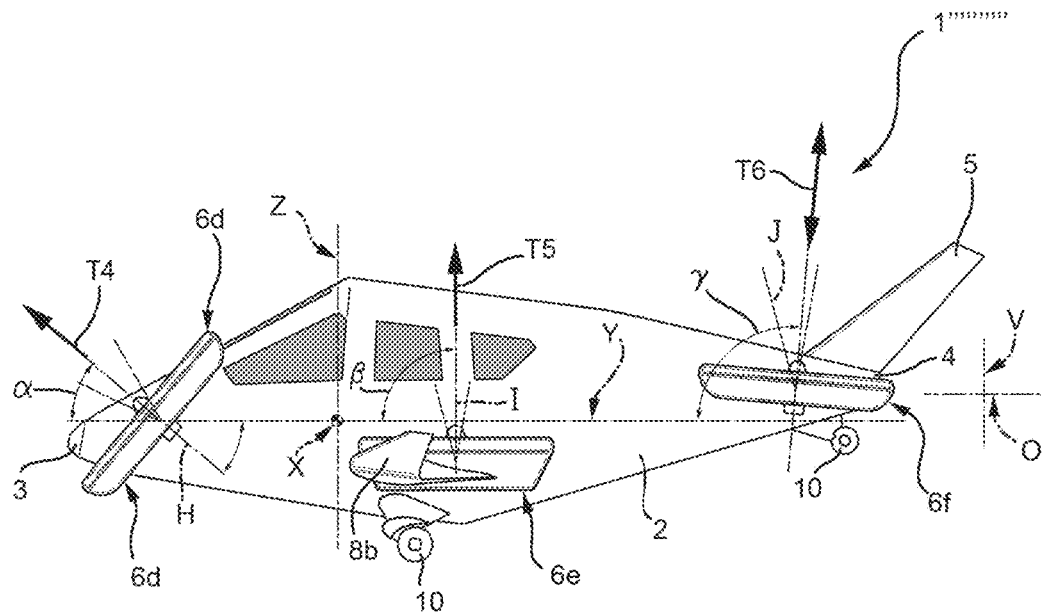

Referring to FIG. 24, reference numeral 1'''''''' indicates an aircraft capable of vertical take-off and landing, according to an eleventh embodiment of the present invention.

Aircraft 1''''''''''' is similar to aircraft 1 and only the difference between aircraft 1'''''', 1 will be described hereinafter; identical or equivalent parts of aircraft 1'''''', 1 will be marked, where possible, with the same reference numbers.

Aircraft 1'''''' differs from aircraft 1 in that angle α ranges between 25 and 60 degrees, and is preferably 40 degrees.

Furthermore, angle β ranges between 75 and 100 degrees, and is preferably 90 degrees.

Angle γ ranges between 75 and 100 degrees, and is preferably 95 degrees.

Preferably, angles α, β, γ are chosen in respective ranges, in such a way to be different from one another.

Preferably, rotors 6b, 6e are disposed in a lower position respect to the Y-axis. More preferably, rotors 6a, 6d and 6b, 6e are disposed in a lower position respect to the Y-axis.

Finally, wings 8a, 8b protrude from respective sides of fuselage 2, preferably in a lower position respect to the Y-axis, or in a lower part of the said fuselage 2.

The operation of aircraft 1''''''' is similar to the one of aircraft 1 and is therefore not described in detail.

Figure 25:
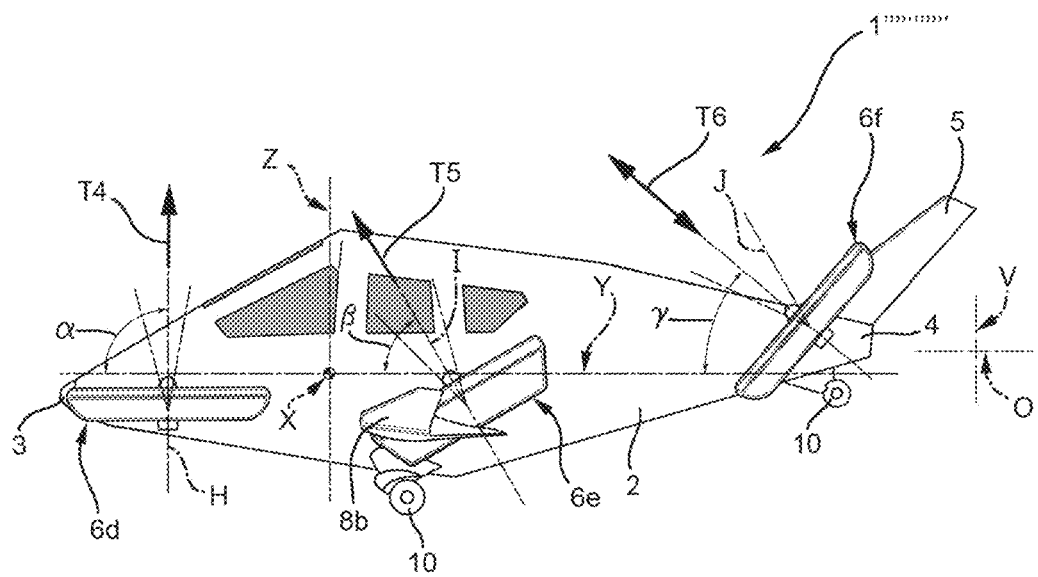

Referring to FIG. 25, reference numeral 1'''''' indicates an aircraft capable of vertical take-off and landing, according to a twelfth embodiment of the present invention.

Aircraft 1''''''''' is similar to aircraft 1 and only the difference between aircraft \\'''''''''', 1 will be described hereinafter; identical or equivalent parts of aircraft 1'''''''''''', 1** will be marked, where possible, with the same reference numbers.

Aircraft 1'''''' differs from aircraft 1 in that angle α ranges between 75 and 100 degrees, and is preferably 90 degrees.

Furthermore, angle β ranges between 45 and 75 degrees, and is preferably 60 degrees.

Angle γ ranges between 25 and 60 degrees, and is preferably 40 degrees.

Preferably, angles α, β, γ are chosen in respective ranges, in such a way to be different from one another.

Preferably, rotors 6b, 6e are disposed in a lower position respect of fuselage 2.

Finally, wings 8a, 8b protrude from respective sides of fuselage 2, preferably in a lower part of the said fuselage 2.

The operation of aircraft 1''''''''''''' is similar to the one of aircraft 1 and is therefore not described in detail.

Figure 26:
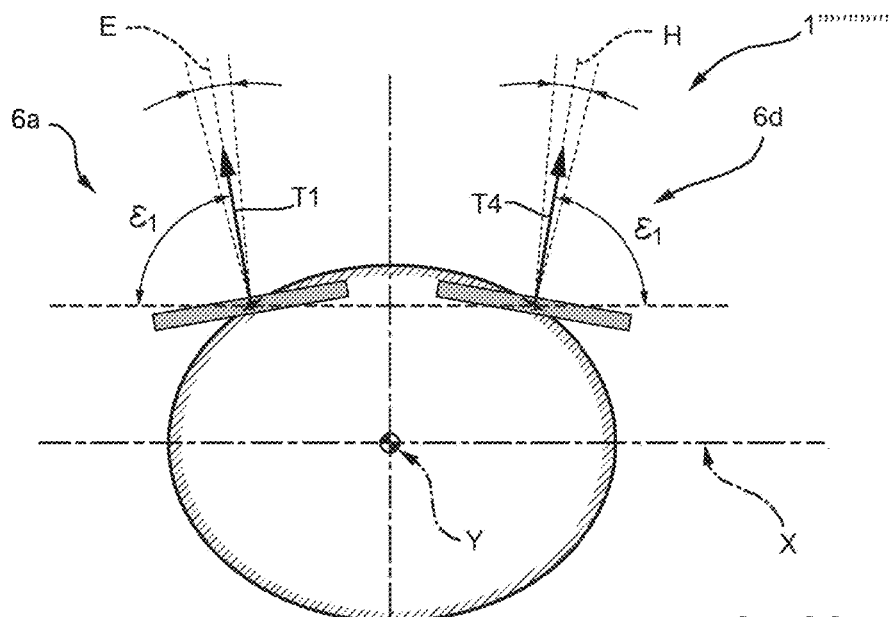
FIG. 26 is a rear view of an thirteenth embodiment of the aircraft capable of vertical take-off and landing according to the invention, with parts removed for clarity.
Figure 27:
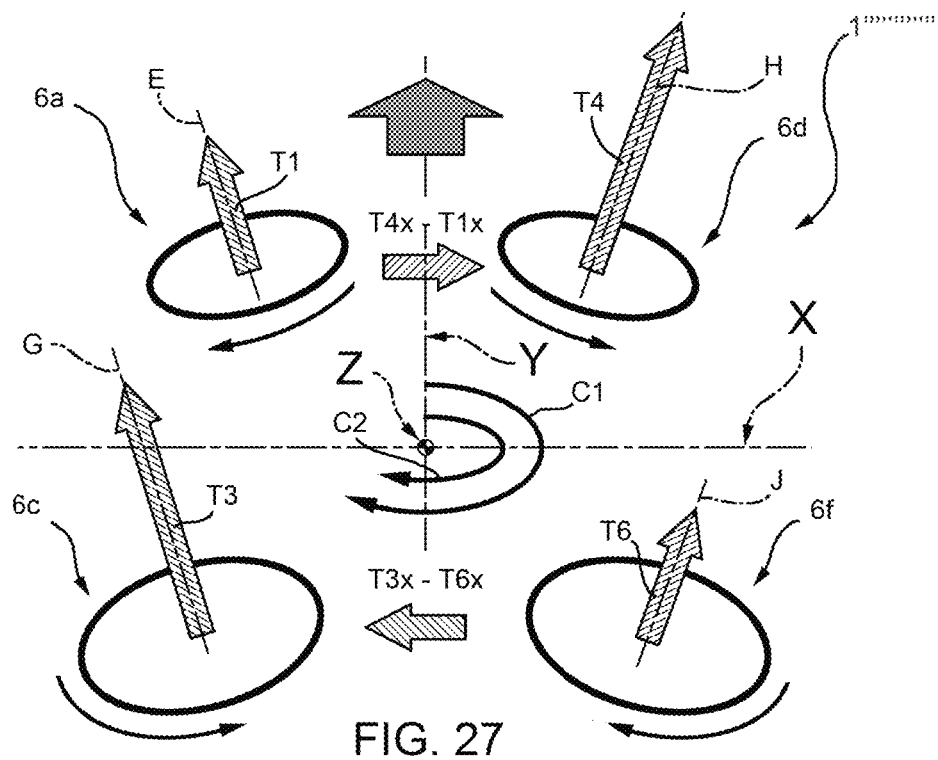
FIG. 27 schematically shows an operative step of the aircraft capable of vertical take-off and landing according to the invention according to the thirteenth embodiment.

Referring to FIGS. 26 and 27, reference numeral 1''''''' indicates an aircraft capable of vertical take-off and landing, according to a thirteenth embodiment of the present invention. FIG. 26 shows schematically a rear view of the aircraft 1''>

Aircraft 1'''''''''' differs from aircraft 1 in that axes E, H of rotors 6a, 6d; axes F, I (not shown) of rotors 6b, 6e; and axes G, J of rotors 6c, 6f are inclined with respect to one another.

In greater detail, axes E, H; F, I; G, J are symmetrically arranged with respect to axis Z.

Still more precisely, axes E, H; F, I; G, J diverge from one another with respect to axis Z, proceeding upwardly and parallel from axis Z from undercarriages 10 towards wings 8a, 8b or from a lower part of the aircraft 1'''''''' towards an upper part of the aircraft 1''''''''''.

In the embodiment shown, axes E, H; F, I and G, J define with axis X equal acute angle E1 ranging between 75 and 85 degrees and preferably equal to 80 degrees.

The operation of aircraft 1'''''''' differs from the operation of aircraft 1 in that the yaw angle is controlled starting as of a configuration in which thrusts T1, T4; T2, T5; T3, T6 do not generate any yaw torque, in such a way that (FIG. 27):

rotor 6a rotates in a first direction, clockwise in FIG. 27, and rotor 6d rotates in a second direction, anticlockwise in FIG. 27;

rotor 6c rotates in the second direction and rotor 6f rotates in the first direction;

thrust T1 generated by rotor 6a assumes a first value and thrust T4 generated by rotor 6d assumes a second value greater than first value;

thrust T3 generated by rotor 6c assumes the second value and thrust T6 generated by rotor 6d assumes the first value.

In this way, the vectorial sum between thrusts T1, T4 has a first component T4x-T1x in a first direction and the vectorial sum between thrusts T3, T6 has a component T3x-T6x in a second direction, opposite to the first direction.

First component T4x-T1x and second component T3x-T6x parallel to axis X generate a yaw torque $C_1$ about axis Z, which allows to adjust the yaw angle of aircraft 1'''''''' as required.

The direction of the resulting yaw torque $C_1$ about axis Z depends on the orientation of the first and the second direction.

Furthermore, thanks to the fact that thrusts T4, T3 greater than thrusts T1, T6 are generated by respective rotors 6d, 6c rotating in the same second direction, a reaction torque C2 with a component parallel to axis Z is generated.

Reaction torque C2—that is oriented in the same direction of yaw torque C1-eases and contributes to the yawing of aircraft 1''''

Furthermore, rotors 6b, 6e (not shown in FIGS. 26 and 27) can be controlled in the same way as rotors 6a, 6d or 6c, 6f conveniently upon yaw-angle ratio required during specific operation or, for example, upon balance control (CG position) of the aircraft 1'''''''' or for combining a roll about axis Y to the yaw about axis Z. Accordingly, thrusts T2, T5 equal thrusts T1, T4 (or T3, T6).

Figure 28:
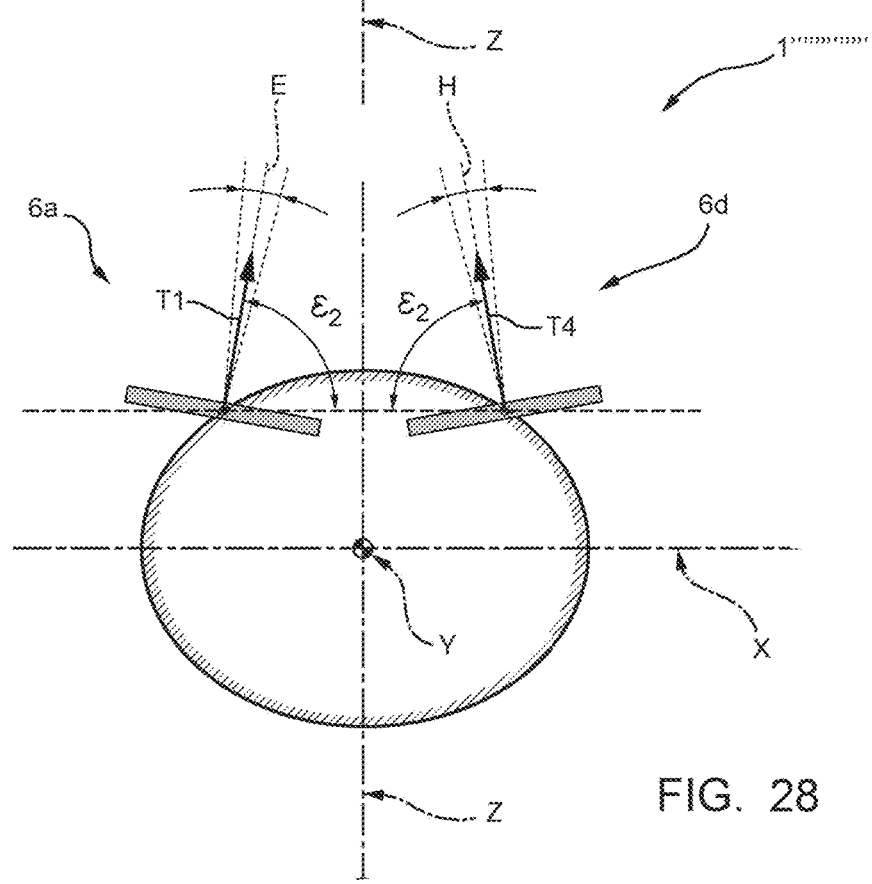
FIG. 28 is a rear view of a fourteenth embodiment of the aircraft capable of vertical take-off and landing according to the invention, with parts removed for clarity.
Figure 29:
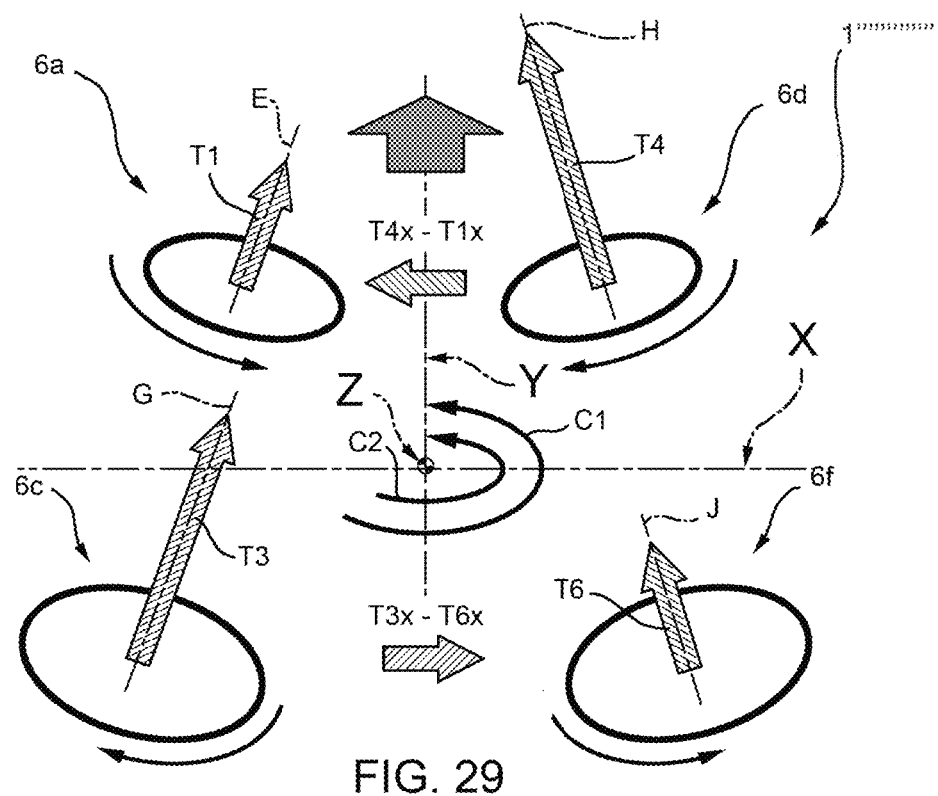
FIG. 29 schematically shows an operative step of the aircraft capable of vertical take-off and landing according to the invention according to the thirteenth embodiment.

Referring to FIGS. 28 and 29, reference numeral 1'''''''''' indicates an aircraft capable of vertical take-off and landing, according to a fourteenth embodiment of the present invention.

Aircraft 1'''''''' differs from aircraft 1 axes E, H; F, I and G, J converge from one another with respect to axis Z, proceeding upwardly and parallel from axis Z from landing gears 10 towards wings 8a, 8b or from a lower part of the aircraft 1'''' towards an upper part of the aircraft In the embodiment shown, axes E, H; F, I and G, J define with axis X equal acute angle E1 ranging between 75 and 85 degrees and preferably equal to 80 degrees.

The operation of aircraft 1'''''''' is similar to the one of aircraft 1'''''''''' and is therefore not described in detail.

From examination of the characteristics of the aircraft 1, 1', 1'', 1''', 1'''''', 1''''', 1'''''''', 1''''''''', 1'''''''''', 1''''''''''''', 1'''''''''''''' and the control method according to the present invention, the advantages that can be achieved therewith are evident.

In particular, the axes E, F, G, H, I, J, K, L, M and N of the rotors 6a, 6b, 6c, 6d, 6e, 6f, 6g' and 6h' are fixed with respect to the aircraft 1, 1', 1''', 1'''', 1''''''''', 1''''', 1'''''''''''', 1''''''''''', 1''''''''''.

In other words, the aircraft 1, 1'', 1''', 1'''', 1''''', 1'''''', 1''''''', 1'''''''', 1''''''''', 1'''''''''', 1''''''''''', 1'''''''''''', 1''''''''''''' can take off, land, hover, fly forwards or assume any flight regime, without requiring changes in the inclination of the thrusts T1, T2, T3, T4, T5, T6, T7, T8, T9 and T10, unlike what happens with helicopters or convertiplanes, and without requiring orienting the direction of engine exhausts, unlike what happens with VTOL aircraft of known type.

This is because the aircraft 1, 1', 1'', 1''', 1'''', 1''''', 1'''''', 1''''''', 1'''''''', 1''''''''', 1'''''''''' enables adjusting the thrust vector T of the thrusts T1, T2, T3, T4, T5, T6, T7, T8, T9 and T10 by simply varying their modulus and direction, but without altering the orientation of the axes E, F, G, H, I, J, K, L, M and N with respect to the aircraft 1, 1', 1''', 1'''', 1''''', 1'''''', 1''''''', 1'''''''', 1''''''''', 1'''''''''', 1'''''''''''', 1''''''''''''''.

In consequence, the aircraft 1, 1', 1''', 1'''', 1''''', 1'''''', 1''''''', 1'''''''', is particularly simple to manufacture and lighter than aircraft of known type and indicated in the introductory part of this description.

In addition, it is possible to control the roll about the Y-axis, the pitch about the X-axis and the yaw about the Z-axis of the aircraft 1, 1', 1'', 1''', 1'''', 1''''', 1'''''', 1''''''', 1'''''''', 1''''''''', 1'''''''''', 1''''''''''', 1'''''''''''' by simply adjusting the thrusts T1, T2, T3, T4, T5, T6, T7, T8, T9 and T10 in both the first and the second attitudes. This enables eliminating, or at least substantially reducing, the need for additional control surfaces.

Furthermore, the aircraft 1, 1', 1''', 1'''', 1''''', 1'''''', 1''''''', 1'''''''', 1''''''''', 1'''''''''', 1''''''''''', 1'''''''''''', 1''''''''''''' is particularly efficient. This is because, in each flight regime, the rotors 6a, 6b, 6c, 6d, 6e, 6f, 6g' and 6h' contribute to generating the lift and/or thrust necessary for flight of the aircraft 1, 1', 1''', 1'''', 1''''', 1'''''', 1''''''', 1'''''''', 1''''''''', 1'''''''''', 1''''''''''', 1'''''''''''' and endow it with manoeuvrability about the X-Y-Z axes. In this way, substantially all the thrusts T1, T2, T3, T4, T5, T6, T7, T8, T9 and T10 are useful for the purposes of operating the aircraft 1, 1', 1''', 1'''', 1''''', 1'''''', 1''''''', 1'''''''', 1''''''''', 1'''''''''', 1''''''''''', 1'''''''''''', reducing the presence of unnecessary aerodynamic resistance.

Moreover, the aircraft 1, 1', 1''', 1'''', 1''''', 1'''''', 1''''''', 1'''''''', 1''''''''', 1'''''''''', 1''''''''''', 1'''''''''''', 1''''''''''''' places few design constraints and is thus found to be particularly versatile. More specifically, fuselages 2 with different geometries and shapes and/or different types of wings 8a and 8b, and/or combustion or hybrid or hydraulic powered drives for the rotors 6a, 6b, 6c, 6d, 6e, 6f, 6g' and 6h' can be used on the aircraft 1, 1', 1'', 1''', 1'''', substantially impacting the positioning and sizing of the rotors 6a, 6b, 6c, 6d, 6e, 6f, 6g' and 6h'.

As the rotors 6a, 6b, 6c, 6d, 6e, 6f, 6g' and 6h' are driven and adjusted independently of one another, the aircraft 1, 1' is particularly suitable for a distributed electric propulsion system, with evident advantages in terms of redundancy and reducing weight and complexity.

The aircraft 1, 1', 1''', 1'''', 1''''', 1'''''', 1''''''', 1'''''''', 1''''''''', 1'''''''''', 1''''''''''', 1'''''''''''', 1''''''''''''' assumes a more nose-down attitude in forward flight conditions with respect to hovering conditions, thereby allowing better passenger comfort.

Axes E, H of rotors 6a, 6d; axes F, I of rotors 6b, 6e; and axis G, J of rotors 6c, 6f of aircraft 1'''''''' shown in FIGS. 26 and 27 (aircraft 1'' shown in FIGS. 28 and 29) diverge from (converge towards) one another with respect to axis Z.

Accordingly, it is possible to control rotors 6a, 6d in such a first component T4x-T1x of vectorial sum of thrusts T1, T4 is directed in the first direction parallel to axis X and the second component T3x-T6x of vectorial sum of thrusts T3, T6 is directed in the second direction, opposite to the first direction.

In this way, the first component T4x-T1x and the second component T3x-T6x generate a yaw torque $C_1$ parallel to axis Z and which can be used for controlling the yaw angle of aircraft 1'''''''', 1''''''''''

Furthermore, being thrusts T4, T3 greater than thrusts T1, T6 are generated by rotors 6d, 6c rotating in the same second direction, reaction torque $C_2$ is generated in the same direction as yaw torque $C_1$, increasing the resulting yaw torque and easing the yaw of aircraft 1'''''''', 1''''''''''.

Additionally, a reaction torque $C_2$ that is generated in the same direction as yaw torque $C_1$, allows to control the yaw angle about axis Z of the aircraft $1''''''''$, $1'''''''''$ with lower energy than in the non-divergent or non-convergent configuration of the rotors 6a, 6b, 6c, 6d, 6e and 6f of aircraft 1.

Finally, it is clear that modifications and variants can be made to the aircraft 1, 1', 1'', 1''', 1'''' 1''''', 1'''''', 1''''''', 1'''''''', 1''''''''', 1'''''''''', 1''''''''''' and control method set forth herein without departing from the scope defined by the claims.

In particular, the aircraft 1, 1', 1''', 1'''', 1''''', 1'''''', 1''''''', 1'''''''', 1''''''''', 1'''''''''', 1''''''''''', 1'''''''''''', 1''''''''''''' can be designed to either accommodate a crew in the fuselage 2 or be remotely piloted, thus defining an OVA. In this last case, the fuselage 2 would be designed to house various types of outfitting.

Furthermore, the thrust vector T needed in the different flight regimes could be obtained by means of a vector sum of thrusts T1, T2, T3, T4, T5, T6, T7, T8, T9 and T10 different from those described.

Furthermore, aircraft 1''', 1'''', 1''''' might comprise not-shown undercarriage similar to undercarriage 110''''''.

Finally, axes E, H; F, I; G, J converging or diverging from one another with respect to axis Z can be implemented, purely by way of non-limitative example, on the aircraft 1, 1', 1''', 1'''', 1''''', 1'''''', 1''''''', 1'''''''', 1''''''''' shown in the FIGS. 1, 12, 14, 16, 17, 19, 20, 21, 22, 24.

The invention claimed is:

1. An aircraft having a longitudinal axis capable of vertical take-off and landing, comprising:
    a fuselage;
    a first propulsion unit configured to generate a first thrust directed parallel to a first axis; and
    a second propulsion unit configured to generate a second thrust directed parallel to a second axis;
    a third propulsion unit interposed between said first and second propulsion units along said longitudinal axis and configured to generate a third thrust directed parallel to a third axis;
    wherein each of said first, second and third propulsion units comprises a respective pair of rotors located symmetrically on opposite sides of said fuselage, each said rotor being coupled to said fuselage;
    said first, second and third propulsion units being configured to be independently operated so as to generate said first, second and third thrusts, respectively;
    said first axis and said second axis being fixed with respect to said aircraft;
    said aircraft further comprising a nose and a tail arranged along a first direction, which is the longitudinal axis of said aircraft, and opposite to one another;
    said first propulsion unit being interposed between said nose and said second propulsion unit along said longitudinal axis; said second propulsion unit being interposed between said first propulsion unit and said tail along said longitudinal axis;
    said first axis and second axis being inclined with respect to a plane that is parallel to said longitudinal axis of said aircraft by a first and a second angle, respectively, which are different from each other;
    said first angle being orientated from said first axis towards said nose; said second angle being orientated from said second axis towards said nose;
    wherein the third axis is inclined with respect to said plane that is parallel to said longitudinal axis by a third angle, said third angle being orientated from said third axis towards said nose;
    said aircraft further comprising:
    a canard configuration comprising a pair of aerodynamic surfaces laterally protruding from said fuselage and at said nose, said pair of rotors of said first propulsion unit being mounted within said canard configuration, said canard configuration including a pair of undercarriages and a pair of frames both supported by respective said aerodynamic surfaces, wherein said undercarriages and said frames are both arranged directly below respective ones of said pair of rotors of said first propulsion unit;
    a control unit programmed to selectively arrange said aircraft in:
        a first attitude during a take-off/landing and/or hovering condition and wherein said aircraft is movable along a second vertical direction; and
        a second attitude during a forward flight condition and wherein said aircraft is movable along a third direction transverse to said second direction;
    said aircraft being movable between said first and second attitudes through inclination parallel to a pitch axis with respect to said aircraft;
    said control unit being operatively connected to said first, second and third propulsion units to adjust a magnitude of respective said first, second and third thrusts to generate a thrust vector of the aircraft with a desired magnitude and direction.

2. The aircraft according to claim 1, wherein, in said first attitude, at least one of said first, second and third propulsion units is configured to be deactivated and the other one or more of said first, second and third propulsion units generates, in use, a respective said first, second or third thrust parallel to said second direction.

3. The aircraft according to claim 1, wherein, in said first attitude, said first and second propulsion units are arranged symmetrically on respective mutually opposite sides of said fuselage with respect to said second direction; and the second direction is perpendicular to the longitudinal axis when said aircraft is in said second attitude.

4. The aircraft according to claim 3, wherein said first and second propulsion units are configured to be controlled to generate respective said first and second thrusts equal to each other in magnitude.

5. The aircraft according to claim 1, further comprising:
    a pair of wings arranged at respective sides of said fuselage and projecting in a cantilever fashion from said fuselage;
    said aircraft being arranged in said first attitude through a first operational configuration of said first, second and third propulsion units in which:
    the rotors of the second propulsion unit are oriented such that said respective second thrusts of the rotors are equal to one another and are directed parallel to said second direction;
    said rotors of the first propulsion unit are oriented such that said respective first thrusts are equal to one another and are directed and are inclined by a fourth angle with respect to said second direction; and
    said rotors of the third propulsion unit are oriented such that said respective third thrusts are inclined by a fifth angle with respect to said second direction and equal to one another;

the aircraft being arranged in said second attitude through a second operational configuration of said first, second and third propulsion units, in which:

the rotors of the first propulsion unit are orientated such that said respective first thrusts are equal to one another and are inclined with respect to said second direction by a sixth angle, having first components parallel to a third direction from said tail toward said nose and second components parallel to said first direction;

the rotors of the second propulsion unit are orientated such that said respective second thrusts are equal to one another and are inclined with respect to said second direction by a seventh angle greater than an eighth angle of the third axis of said third propulsion unit, having third components parallel to the third direction and fourth components parallel to said second direction; and the rotors of the third propulsion unit are orientated such that the third axis and said respective third thrusts are parallel to said second direction.

6. The aircraft of claim 1, wherein said pair of first rotors of said first propulsion unit are supported by said respective aerodynamic surfaces.

7. The aircraft of claim 6, wherein said pair of rotors of the first propulsion unit are supported by respective ends of said aerodynamic surfaces opposite to said fuselage.

8. The aircraft of claim 7, wherein said respective free ends are planar.

9. The aircraft of claim 7, wherein said respective ends are concave on the opposite side with respect to said fuselage.

10. The aircraft of claim 6, wherein said aerodynamic surfaces comprise respective free ends, and in that each of said pair of rotors of the first propulsion unit is interposed between said fuselage and said relative free end.

11. The aircraft of claim 6, wherein said pair of rotors of the first propulsion unit are shrouded.

12. The aircraft of claim 1, wherein said first angle ranges between 25 and 40 degrees, said second angle ranges between 75 and 105 degrees, and said third angle ranges between 75 and 115 degrees.

13. The aircraft of claim 1, wherein said first angle ranges between 75 and 100 degrees, said second angle ranges between 75 and 100 degrees, and said third angle ranges between 25 and 65 degrees.

14. The aircraft of claim 1, wherein said first angle ranges between 70 and 95 degrees, said second angle ranges between 25 and 55 degrees, and said third angle ranges between 65 and 95 degrees.

15. The aircraft of claim 1, wherein said first angle ranges between 25 and 60 degrees, said second angle ranges between 75 and 100 degrees, and said third angle ranges between 75 and 100 degrees.

16. The aircraft of claim 1, wherein said first angle ranges between 75 and 100 degrees, said second angle ranges between 45 and 75 degrees, and said third angle ranges between 25 and 60 degrees.

17. The aircraft of claim 1, wherein said third angle is greater than said first angle and less than said second angle.

18. A method for controlling an aircraft comprising a nose, fuselage and a tail positioned along a longitudinal axis and capable of vertical take-off and landing, comprising the steps of:

providing on said aircraft first, second and third propulsion units, each operable independently, wherein the first propulsion unit is situated between the nose and the second propulsion unit, the second propulsion is situated unit along the longitudinal axis between the first propulsion unit and the tail, and the third propulsion is situated between the first and second propulsion units on the longitudinal axis, wherein each of the first, second and third propulsion unit comprising a respective pair of first, second and third rotors located symmetrically on opposite sides of said fuselage, each said rotor being coupled to said fuselage;

providing on said aircraft a canard configuration comprising a pair of aerodynamic surfaces laterally protruding from said fuselage and at said nose, said pair of rotors of said first propulsion unit being mounted within said canard configuration, said canard configuration including a pair of undercarriages and a pair of frames both supported by respective said aerodynamic surfaces, wherein said undercarriages and said frames are both arranged directly below respective ones of said pair of rotors of said first propulsion unit;

generating a first thrust directed parallel to a first axis by means of the first propulsion unit;

generating a second thrust directed parallel to a second axis by means of the second propulsion unit;

generating a third thrust directed parallel to a third axis by means of the third propulsion unit;

maintaining said first axis and said second axis of the respective said first and second thrusts fixed with respect to said aircraft, wherein the first axis and second axis are included with respect to a plan parallel to the longitudinal axis by a first and a second angle, respectively, which are different from each other, with the first angle smaller than the second angle, and the first angle and second angle being oriented from the first axis toward the nose;

adjusting a magnitude of respective said first, second and third thrusts to generate a thrust vector of the aircraft with a desired magnitude and direction, by means of a control unit operatively connected to said first, second and third propulsion units;

said control unit being programmed to selectively arrange said aircraft in:-a first attitude assumed during a take-off/landing and/or hovering condition and wherein said aircraft is movable along a second direction that is vertical, said thrust vector of the aircraft being parallel to said second direction and directed upwards in said first attitude; and a second attitude assumed during a forward flight condition and wherein said aircraft is movable along a third direction transverse to said second direction;

said step of adjusting said magnitude of respective said first, second and third thrusts comprising the steps of:

inclining said aircraft about a pitch axis transverse to said longitudinal axis to move said aircraft between said first attitude and second attitude; and arranging said aircraft in a plurality of intermediate attitudes between said first and second attitudes and where said thrust vector of the aircraft has a component parallel to said first direction and a component parallel to said second direction.

19. The method according to claim 18, further comprising the step of deactivating at least one of said first, second and third propulsion units and generating by means of the other of said first, second and third propulsion units a respective said first, second or third thrust parallel to said second direction, when said aircraft is in said first attitude.

20. The method according to claim 18, further comprising the step of regulating the magnitudes of said first and second thrusts so as to control either a first rotation about a fourth direction transverse to said longitudinal axis and integral with said aircraft, or a second rotation about a fifth direction transverse to said fourth direction.

21. The method according to claim 18, comprising the steps of:
generating respective first thrusts directed parallel to said first axis by means of said first propulsion unit;
generating respective second thrusts directed parallel to said second axis by means of said second propulsion unit; and
said aircraft further comprising:
a pair of wings arranged at respective sides of said fuselage and projecting in a cantilever fashion from said fuselage;
said method further comprising the step of interposing said third propulsion unit between said first and second propulsion units;
generating, by means of said pair of third rotors of the third propulsion unit respective third thrusts parallel to said third axis, which is inclined with respect to said plane that is parallel to said longitudinal axis by said third angle;
arranging said aircraft in said first attitude through a first operational configuration of said first and fourth propulsion units, second and fifth propulsion units and third and sixth propulsion units, in which:
said pair of second rotors of the second unit are oriented such that said respective second thrusts are equal to one another and are directed parallel to said second direction,
said pair of first rotors of the first propulsion unit are oriented such that said respective first thrusts are equal to one another and are inclined by a fourth angle with respect to said second direction; and
said pair of third rotors of the third propulsion unit are oriented such that said respective third thrusts are equal to one another and are is inclined by a fifth angle with respect to said second direction;
arranging said aircraft in said second attitude through a second operational configuration of said first, second and third propulsion units, in which:
said pair of first rotors of the first propulsion unit are orientated such that said respective first thrusts are equal to one another and are inclined with respect to said second direction by a sixth angle, having first components parallel to a third direction from said tail toward said nose and second components parallel to said second direction;
said pair of second rotors of the second propulsion unit are orientated such that said respective second thrusts are equal to one another and are inclined with respect to said second direction by a seventh angle greater than and eighth angle of said third axis of said third propulsion unit, having third components parallel to said third direction and fourth components parallel to second direction; and
said third and sixth propulsion units are orientated such that the third axis and said respective third thrusts are parallel to said second direction.

22. The method according of claim 21, wherein one rotor of the first pair of rotors of the first propulsion unit and one rotor of the third pair of rotors of said third propulsion unit are arranged on a same first side of said fuselage,
wherein another rotor of the pair of first rotors of the first propulsion unit and another rotor of the pair of third rotors of said third propulsion unit are arranged on a same second side, opposite to said first side, of said fuselage;
said method comprising the steps of:
controlling said first thrusts generated by the pair of first rotors of the said first propulsion unit so as to generate a first differential thrust along said fourth direction; and
controlling said third thrusts generated by the pair of third rotors rotors of the third propulsion unit so as to generate a second differential thrust directed opposite to said first differential thrust and along said fourth direction;
said first and second differential thrusts generating a torque parallel to said fourth axis on said aircraft.

23. The method of claim 22, further comprising the steps of:
driving said one rotor of the pair of first rotors of said first propulsion unit and said another rotor of said pair of third rotors of the third propulsion unit in rotation in a same rotation direction and with a same first value of thrust; and
driving said another rotor of the pair of first rotors of said first propulsion unit and another rotor of the pair of third rotors of said third propulsion unit in rotation in another same but opposite rotation direction to the rotation direction of the one rotor of the pair of first rotors of the first propulsion unit and said another rotor of the pair of third rotors of said third propulsion unit and with a same second value of thrust greater than said same first value.

24. The method of claim 18, wherein said third angle is greater than said first angle and less than said second angle.

* * * * *